US008383747B2

(12) United States Patent
Torii et al.

(10) Patent No.: US 8,383,747 B2

(45) **Date of Patent: *Feb. 26, 2013**

(54) WATER ABSORBENT RESIN PRODUCTION METHOD, WATER ABSORBENT RESIN, AND USAGE THEREOF

(75) Inventors: Kazushi Torii, Hyogo (JP); Taishi Kobayashi, Hyogo (JP)

(73) Assignee: Nippon Shokubai Co., Ltd., Osaka (JP)

( * ) Notice: Subject to any disclaimer, the term of this patent is extended or adjusted under 35 U.S.C. 154(b) by 45 days.

This patent is subject to a terminal disclaimer.

(21) Appl. No.: 13/252,665

(22) Filed: Oct. 4, 2011

(65) Prior Publication Data

US 2012/0037847 A1 Feb. 16, 2012

Related U.S. Application Data

(62) Division of application No. 12/530,957, filed as application No. PCT/JP2008/055182 on Mar. 14, 2008, now abandoned.

(30) Foreign Application Priority Data

Mar. 16, 2007 (JP) ................................ 2007-069634
Mar. 19, 2007 (JP) ................................ 2007-071627

(51) Int. Cl.
*C08F 120/06* (2006.01)

(52) U.S. Cl. ....... 526/317.1; 526/89; 526/210; 526/217; 524/556; 523/111

(58) Field of Classification Search ........................ None
See application file for complete search history.

(56) References Cited

U.S. PATENT DOCUMENTS

| | | | |
|---|---|---|---|
| 5,624,967 | A | 4/1997 | Hitomi et al. |
| RE37,021 | E | 1/2001 | Aida |
| 6,228,930 | B1 | 5/2001 | Dairoku et al. |
| 6,458,921 | B1 | 10/2002 | Dairoku et al. |
| 6,750,262 | B1 | 6/2004 | Hahnle et al. |
| 2002/0061978 | A1 | 5/2002 | Hatsuda et al. |

(Continued)

FOREIGN PATENT DOCUMENTS

| | | |
|---|---|---|
| EP | 0632068 | 1/1995 |
| JP | 60177004 | 9/1985 |

(Continued)

OTHER PUBLICATIONS

English Abstract of JP 2004-261797 (Sep. 24, 2004).*

(Continued)

*Primary Examiner* — Vu A Nguyen

(74) *Attorney, Agent, or Firm* — Roylance, Abrams, Berdo & Goodman, L.L.P.

(57) ABSTRACT

A method for producing a water absorbent resin by (i) polymerizing a monomer including an unsaturated monomer containing a carboxyl group, in the presence of an internal cross-linking agent (A) having two or more radical polymerizable unsaturated groups and in the presence of a non-polymeric internal cross-linking agent (B) having two or more functional groups each allowing formation of an ester bond or an amide bond by reacting with a carboxyl group, while crushing a cross-linked polymer hydrogel; and (ii) drying the cross-linked polymer hydrogel of step (i), wherein: an amount of the internal cross-linking agent (A) is 0.01 mol % or more and 0.2 mol % or less relative to an amount of the unsaturated monomer containing a carboxyl group, and a molar ratio (B)/(A) of the internal cross-linking agent (A) and the non-polymeric internal cross-linking agent (B) is 0.01 or more and 1.8 or less.

11 Claims, 1 Drawing Sheet

U.S. PATENT DOCUMENTS

| | | | |
|---|---|---|---|
| 2003/0008946 A1 | 1/2003 | Dairoku et al. | |
| 2003/0130640 A1 | 7/2003 | Dodge et al. | |
| 2004/0186244 A1 | 9/2004 | Hatsuda et al. | |
| 2006/0073969 A1 | 4/2006 | Torii et al. | |
| 2006/0204755 A1 | 9/2006 | Torii et al. | |
| 2006/0235141 A1 | 10/2006 | Riegel et al. | |
| 2007/0060691 A1 | 3/2007 | Kim | |
| 2007/0178786 A1 | 8/2007 | Nawata et al. | |
| 2008/0027180 A1* | 1/2008 | Higashimoto et al. | 525/330.3 |
| 2010/0041824 A1 | 2/2010 | Torii et al. | |

FOREIGN PATENT DOCUMENTS

| | | |
|---|---|---|
| JP | 6200168 | 7/1994 |
| JP | 1157465 | 3/1999 |
| JP | 200095955 | 4/2000 |
| JP | 200320363 | 1/2003 |
| JP | 2004131596 | 4/2004 |
| JP | 2004-261797 | 9/2004 |
| JP | 2005200630 | 7/2005 |
| JP | 2006199805 | 8/2006 |
| JP | 2006225455 | 8/2006 |
| JP | 200818328 | 1/2008 |
| WO | 0145758 | 6/2001 |

OTHER PUBLICATIONS

International Search Report for PCT/JP2008/055182 dated Jul. 1, 2008.

Search Report from the European Patent Office dated Apr. 16, 2010 in corresponding European Application No. 08722551.2.

Office Action in U.S. Appl. No. 12/530,976 dated Dec. 8, 2010.

Office Action in U.S. Appl. No. 12/530,976 dated Mar. 25, 2011.

Office Action in parent U.S. Appl. No. 12/530,957 dated Jul. 15, 2011.

* cited by examiner

WATER ABSORBENT RESIN PRODUCTION METHOD, WATER ABSORBENT RESIN, AND USAGE THEREOF

CROSS-REFERENCE TO RELATED APPLICATIONS

This application is a divisional of U.S. application Ser. No. 12/530,957, filed Sep. 11, 2009, which application is a U.S. national stage application and claims the benefit of PCT application Serial No. PCT/JP2008/055182, filed Mar. 14, 2008, which claims priority to each of Japanese application No. 2007-069634, filed Mar. 16, 2007, and Japanese application No. 2007-071627, filed Mar. 19, 2007, each of which is hereby incorporated by reference in its entirety.

TECHNICAL FIELD

The present invention relates in general to a water absorbent resin production method, a water absorbent resin, and usage thereof. The present invention particularly relates to (i) a water absorbent resin production method, (ii) a water absorbent resin, each of which realizes a smaller amount of undried products resulting from insufficient fragmentation of a cross-linked polymer hydrogel even in case of carrying out polymerization in the presence of an internal cross-linking agent while crushing so as to obtain the cross-linked polymer hydrogel and drying the obtained cross-linked polymer hydrogel without further crushing after the polymerization, and (iii) usage thereof.

BACKGROUND ART

A water absorbent resin obtained by polymerizing an unsaturated monomer containing a carboxyl group is widely used for various applications such as application as sanitary materials, e.g., disposable diapers for babies, sanitary napkins, and incontinent pads, application in agriculture/horticulture, application as a cable waterproofing agent, application in civil engineering and construction, and food related application. The water absorbent resin is typically obtained as a result of processes including drying of a cross-linked polymer hydrogel crushed to a size easy to dry, a pulverization step, a classification step, a surface cross-linking step, and the like. The cross-linked polymer hydrogel is obtained by polymerizing an unsaturated monomer containing a carboxyl group in the presence of an internal cross-linking agent.

In the production of the water absorbent resin, a method used as a method for crushing the cross-linked polymer hydrogel is one or a combination of a method of concurrently polymerizing and crushing in a reaction container including crushing means and a method of crushing the cross-linked polymer hydrogel by a crusher or the like after polymerization without crushing.

In particular, according to the method of concurrently polymerizing and crushing in a reaction container including crushing means, an additional crushing process of the cross-linked polymer hydrogel is not required after polymerization. The cross-linked polymer hydrogel can be dried directly after the polymerization. Therefore, this method is superior in regard to efficiency.

In this way, a fragmented cross-linked polymer hydrogel can be obtained by using the method of concurrently polymerizing and crushing. The fragmented cross-linked polymer hydrogel is different from a clump of jelly-like cross-linked polymer hydrogel obtained by using the method of polymerizing without crushing.

However, recently, in view of water absorbent properties of a water absorbent resin, there is an increasing trend in which polymerization is carried out in the presence of a large amount of internal cross-linking agent. The cross-linked polymer hydrogel is obtained as a hard gel in the presence of a large amount of internal cross-linking agent. Accordingly, when polymerization in the presence of a large amount of internal cross-linking agent is carried out by using the method of concurrently polymerizing and crushing in a reaction container including crushing means, the cross-linked polymer hydrogel cannot be fragmented as finely as in a case where the cross-linked polymer hydrogel is a soft gel. This results in a large piece of gel of the cross-linked polymer hydrogel. This causes a problem such that the large piece of gel remains as an undried cross-linked polymer hydrogel (hereinafter in the specification, the "undried cross-linked polymer hydrogel" may be referred to as an "undried product") in a case where the cross-linked polymer hydrogel obtained is directly dried.

Because the undried product is like rubber and has very strong cohesion, the undried product has a difficulty in processing. For example, sticking to a pulverizer in a pluverization process, the undried product tends to cause a trouble to stop operation of the pulverizer. Therefore, it is necessary to reduce the undried product as much as possible.

The foregoing disadvantage of the undried polymer occurs not only in case of concurrently polymerizing and crushing the cross-linked polymer hydrogel in the reaction container including crushing means but also in a case of adopting a general method. As a method for solving the disadvantage without excessive drying, there is known a method of separating and removing the particles of the undried product whose volume and mass is larger than particles of a dried product by classification or the like and further recycling the undried product.

The problem above is significant particularly in the case of polymerization in the presence of a large amount of internal cross-linking agent. There are some reports concerning a method of using, as an internal cross-linking agent, a combination, in a predetermined proportion, of (i) an internal cross-linking agent having at least two radical polymerizable unsaturated groups in its single molecule and (ii) an internal cross-linking agent having in its single molecule at least two functional groups that can react with a carboxyl group (Refer to, for example, Patent Documents 1 through 6).

For example, Patent Document 1 discloses a technique in which (i) a compound having at least two unsaturated groups in its single molecule and (ii) a compound having at least two epoxy groups in its single molecule as functional groups that can react with a carboxylic group are used in a specific proportion in polymerization, for the purpose of producing a water absorbent resin that has excellent absorbency against pressure and low extractable polymer content.

Moreover, Patent Document 2 discloses a technique in which a cross-linking agent containing a polyvinyl first cross-linking agent and a hydroxyl-containing second cross-linking agent are used in polymerization for the purpose of producing a water absorbent resin having a high gel bed permeability (i.e. liquid permeability) and a low absorption capacity.

Further, Patent Document 3 discloses a technique in which a compound having at least two unsaturated groups in its single molecule and alkylene carbonate are used in polymerization for the purpose of providing a water absorbent resin generating sound in water-absorption.

In addition, Patent Documents 4 through 6 disclose a technique in which an acrylic ammonium salt, an internal cross-linking agent having at least two unsaturated groups in its single molecule, and a condensation-type cross-linking agent such as glycerin are used for the purpose of improving absorbing performance.

[Patent Document 1] Japanese Unexamined Patent Publication No. 188602/1996 (Tokukaihei 8-188602) (published on Jul. 23, 1996)

[Patent Document 2] Japanese Unexamined Patent Publication No. 518150/2003 (Tokukai 2003-518150) (published on Jun. 3, 2003)

[Patent Document 3] Japanese Unexamined Patent Publication No. 200168/1994 (Tokukaihei 6-200168) (published on Jul. 19, 1994)

[Patent Document 4] Japanese Unexamined Patent Publication No. 200630/2005 (Tokukai 2005-200630) (published on Jul. 28, 2005)

[Patent Document 5] Japanese Unexamined Patent Publication No. 199805/2006 (Tokukai 2006-199805) (published on Aug. 3, 2006)

[Patent Document 6] Japanese Unexamined Patent Publication No. 225455/2006 (Tokukai 2006-225455) (published on Aug. 31, 2006)

DISCLOSURE OF INVENTION

Problems to be Solved by the Invention

However, conventionally, as a method to solve a problem of an undried product caused by a large piece of gel that is not fragmented in a case where polymerization is carried out concurrently with crushing in a region having a large amount of an internal cross-linking agent, there was only a method of additionally crushing a cross-linked polymer hydrogel by a crusher or a method of separating particles of the undried product.

If there is a polymerization method in which the cross-linked polymer hydrogel is sufficiently fragmented and no large piece is produced even in the presence of a large amount of internal cross-linking agent in a case where polymerization is carried out while crushing the cross-linked polymer hydrogel produced, production of the water absorbent resin does not require a process of additionally crushing the cross-linked polymer hydrogel obtained by polymerization or a process of separating the undried product. This makes it possible to improve efficiency of production of the water absorbent resin.

The present invention is attained in view of the problem mentioned above. The purpose of the present invention is to provide a method for producing a water absorbent resin in which an undried product resulting from insufficient granulation of a cross-linked polymer hydrogel is reduced even in case where the cross-linked polymer hydrogel obtained by simultaneous polymerization and crushing in the presence of an internal cross-linking agent is dried without any further crushing.

Means to Solve the Problems

In order to solve the problem mentioned above, a method for producing a water absorbent resin of the present invention comprises the steps of: (i) polymerizing a monomer including an unsaturated monomer containing a carboxyl group, in the presence of an internal cross-linking agent (A) having two or more radical polymerizable unsaturated groups in its single molecule and in the presence of a non-polymeric internal cross-linking agent (B) having in its single molecule two or more functional groups each of which allows formation of an ester bond or an amide bond by reacting with a carboxyl group, while crushing a cross-linked polymer hydrogel; and (ii) drying the cross-linked polymer hydrogel obtained in the step (i), wherein: an amount of the internal cross-linking agent (A) is 0.01 mol % or more and 0.2 mol % or less relative to an amount of the unsaturated monomer containing a carboxyl group, and a molar ratio (B)/(A) of the internal cross-linking agent (A) and the non-polymeric internal cross-linking agent (B) is 0.01 or more and 1.8 or less.

According to the method of producing the water absorbent resin of the present invention, it is preferable that the internal cross-linking agent (B) has in its single molecule two or three functional groups each of which allows formation of an ester bond or an amide bond by reacting with a carboxyl group.

According to the method of producing the water absorbent resin of the present invention, it is preferable that each of the functional groups of the internal cross-linking agent (B) which functional group allows formation of the ester bond or the amide bond by reacting with a carboxyl group reacts with the carboxyl group at 110° C. or higher temperature.

According to the method of producing the water absorbent resin of the present invention, it is preferable that each of the functional groups is a hydroxyl group.

According to the method of producing the water absorbent resin of the present invention, it is preferable that a molecular weight of the internal cross-linking agent is 40 or more and 500 or less.

According to the method of producing the water absorbent resin of the present invention, it is preferable that the unsaturated monomer containing a carboxyl group is an acrylic acid and/or an alkali metal salt thereof.

According to the method of producing the water absorbent resin of the present invention, it is preferable that the step (ii) is carried out so that an amount of the internal cross-linking agent (B) remaining in the water absorbent resin obtained in the step (ii) is not more than $1.0\times10^{-5}$ mol/g.

According to the method of producing the water absorbent resin of the present invention, it is preferable to further comprise the step (iii) of mixing the water absorbent resin obtained in the step (ii) with a surface cross-linking agent and heating the mixture so as to cross-link the surface of the water absorbent resin.

According to the method of producing the water absorbent resin of the present invention, it is preferable that: the step (iii) is carried out so that a centrifugal retention capacity (CRC) of the water absorbent resin whose surface has been cross-linked is lower, by not less than 3 g/g, than a centrifugal retention capacity of the water absorbent resin whose surface has not been cross-linked and the centrifugal retention capacity (CRC) of the water absorbent resin whose surface has been cross-linked is not less than 26 g/g.

According to the method of producing the water absorbent resin of the present invention, it is preferable that the step (iii) is carried out so that an amount of the internal cross-linking agent (B) remaining in the water absorbent resin whose surface has been cross-linked is not more than $0.1\times10^{-5}$ mol/g.

A method of producing a water absorbing agent including the water absorbent resin and a liquid permeability improving agent is a method comprising the step of adding the liquid permeability improving agent to the water absorbent resin having been produced by the foregoing method.

In order to solve the problem mentioned above, a water absorbent resin of the present invention is obtained by polymerizing a monomer including an unsaturated monomer containing a carboxyl group, and has an internal cross-linked structure, and has been subjected to a surface cross-linking treatment, wherein the internal cross-linked structure including: an internal cross-linking agent (A) having two or more radical polymerizable unsaturated groups in its single molecule; and a non-polymeric internal cross-linking agent (B) having in its single molecule two or more functional groups each of which allows formation of an ester bond or an amide bond by reacting with a carboxyl group, and an amount of the internal cross-linking agent (A) is 0.01 mol % or more and 0.2 mol % or less relative to an amount of the unsaturated monomer containing a carboxyl group, and a molar ratio (B)/(A) of the internal cross-linking agent (A) and the non-polymeric internal cross-linking agent (B) is 0.01 or more and 1.8 or less.

According to the water absorbent resin of the present invention, it is preferable that the internal cross-linking agent (B) has in its single molecule two or three functional groups each of which allows formation of an ester bond or an amide bond by reacting with a carboxyl group.

According to the water absorbent resin of the present invention, it is preferable that each of the functional groups is a hydroxyl group.

According to the water absorbent resin of the present invention, it is preferable that a molecular weight of the internal cross-linking agent is 40 or more and 500 or less.

According to the water absorbent resin of the present invention, it is preferable that the unsaturated monomer containing a carboxyl group is an acrylic acid and/or an alkali metal salt thereof.

According to the water absorbent resin of the present invention, it is preferable that a centrifugal retention capacity (CRC) of the water absorbent resin is not less than 26 g/g.

According to the water absorbent resin of the present invention, it is preferable that an amount of the internal cross-linking agent (B) remaining in the water absorbent resin is not more than $0.1\times10^{-5}$ mol/g.

It is preferable that a water absorbing agent of the present invention comprises the water absorbent resin and a liquid permeability improving agent.

Effect of the Invention

As mentioned above, a method for producing a water absorbent resin of the present invention comprises the steps of: (i) polymerizing a monomer including an unsaturated monomer containing a carboxyl group, in the presence of an internal cross-linking agent (A) having two or more radical polymerizable unsaturated groups in its single molecule and in the presence of a non-polymeric internal cross-linking agent (B) having in its single molecule two or more functional groups each of which allows formation of an ester bond or an amide bond by reacting with a carboxyl group, while crushing a cross-linked polymer hydrogel; and (ii) drying the cross-linked polymer hydrogel obtained in the step (i), wherein: an amount of the internal cross-linking agent (A) is 0.01 mol % or more and 0.2 mol % or less relative to an amount of the unsaturated monomer containing a carboxyl group, and a molar ratio (B)/(A) of the internal cross-linking agent (A) and the non-polymeric internal cross-linking agent (B) is 0.01 or more and 1.8 or less. This makes it possible to produce a water absorbent resin in which an undried product resulting from insufficient granulation of a cross-linked polymer hydrogel is reduced even in case where the cross-linked polymer hydrogel obtained is dried without any further crushing.

Moreover, in a case where (B)/(A) is large, that is, in a case of using a large amount of internal cross-linking agent (B) to be reacted in a subsequent drying process, it is difficult to control an amount of the internal cross-linking agent (B) to be reacted in the drying process. This results in production of a water absorbent resin having a different degree of internal cross linking. Consequently, this varies Centrifugal Retention Capacity (CRC) that is an indicator indicating an absorption capacity of the water absorbent resin obtained. The above arrangement that limits an amount of (B) with respect to (A) stabilizes the variation in CRC. As a result, it becomes possible to produce a water absorbent resin having a stable performance.

Further, the arrangement above is effective in obtaining the water absorbent resin having an excellent Absorption Against Pressure (AAP) of the water absorbent resin damaged.

For a fuller understanding of the nature and advantages of the invention, reference should be made to the ensuing detailed description taken in conjunction with the accompanying drawings.

BEST MODE FOR CARRYING OUT THE INVENTION

Figure 1:
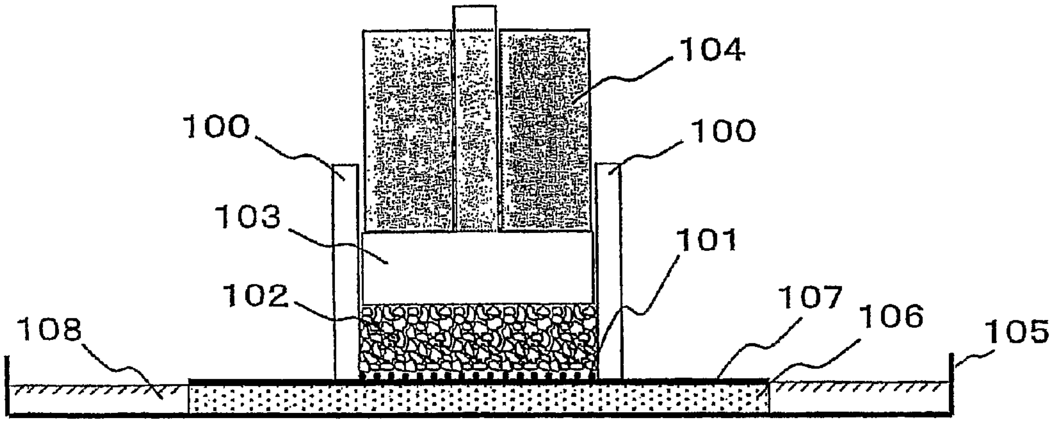
FIG. 1 is a cross sectional view schematically illustrating a measurement apparatus used in measurement of AAP.

The following describes a method for producing a water absorbent resin in accordance with the present invention. The following also describes the water absorbent resin and usage thereof. Respective values of (a) Centrifugal Retention Capacity (CRC), (b) Absorbency Against Pressure (AAP) of 4.83 kPa, (c) Saline Flow Conductivity (SFC), (d) particle diameter, and (e) logarithmic standard deviation ($\sigma\zeta$) of particle diameter distribution in the present invention are those measured with the methods described in the Examples below. In the present invention, “weight” is used as a synonym of “mass”, and “weight %” is used as a synonym of “weight %”.

(1) A method for producing a water absorbent resin in accordance with the present invention and the usage thereof.

The method for producing a water absorbent resin in accordance with the present invention includes the steps of: (i) polymerizing a monomer including an unsaturated monomer containing a carboxyl group, in the presence of an internal cross-linking agent (A) having two or more radical polymerizable unsaturated groups in its single molecule and in the presence of a non-polymeric internal cross-linking agent (B) having in its single molecule two or more functional groups each of which allows formation of an ester bond or an amide bond by reacting with a carboxyl group, while crushing a cross-linked polymer hydrogel; and (ii) drying the cross-linked polymer hydrogel obtained in the step (i), wherein: an amount of the internal cross-linking agent (A) is 0.01 mol % or more and 0.2 mol % or less relative to an amount of the unsaturated monomer containing a carboxyl group, and a molar ratio (B)/(A) of the internal cross-linking agent (A) and the non-polymeric internal cross-linking agent (B) is 0.01 or more and 1.8 or less.

It is possible that the method of the present invention further include the step (iii) of mixing the water absorbent resin obtained in the step (ii) with a surface cross-linking agent and heating the mixture so as to cross-link the surface of the water absorbent resin.

Further, a method for producing a water absorbing agent including the water absorbent resin and a liquid permeability improving agent comprises the step of adding the liquid permeability improving agent to the water absorbent resin having been produced by the water absorbent resin production method according to the present invention, and this method utilizes the present invention, so that also the method is encompassed within the present invention. That is to say, the method for producing the water absorbing agent in accordance with the present invention may utilize the method for producing the water absorbent resin in accordance with the present invention and may include adding the liquid permeability improving agent to the water absorbent resin.

The following describes the method for producing the water absorbent resin in accordance with the present invention and the usage thereof. In the following description, (1-1) polymerizing, (1-2) drying, (1-3) surface cross-linking, (1-4) usage of the method for producing the water absorbent resin, and (1-5) other steps are discussed in this order as listed.

(1-1) Polymerizing

In this step, the cross-linked polymer hydrogel is obtained by polymerizing a monomer including an unsaturated monomer containing a carboxyl group, in the presence of an internal cross-linking agent (A) having two or more radical polymerizable unsaturated groups in its single molecule and in the presence of a non-polymeric internal cross-linking agent (B) having in its single molecule two or more functional groups each of which allows formation of an ester bond or an amide bond by reacting with a carboxyl group, while crushing the resulting cross-linked polymer hydrogel.

<Method of Polymerization>

In the present invention, "crushing" implies at least fragmenting the cross-linked polymer hydrogel, which is produced as polymerization of the monomer including the unsaturated monomer containing a carboxyl group proceeds, into smaller pieces such that the cross-linked polymer hydrogel becomes easy to dry in the following step of drying. Further, "while crushing" implies that the crushing is carried out at the same time as the polymerization period, which is from a start of the polymerization to an end of a most suitable polymerization period. It is not always necessary to carry out the crushing throughout the polymerization period. It is preferable that the cross-linked polymer hydrogel thus crushed contain fewer gel pieces that are large enough to become undried products under common drying conditions. It is preferable that an average particle diameter of particles of the cross-linked polymer hydrogel thus crushed be in the range of 0.1 mm to 5 mm, preferably in the range of 0.5 mm to 3 mm. Further, it is preferable that the particles each having a diameter of 5 mm or greater be 10 weight % or less, preferably 5 weight % or less, with respect to the whole cross-linked polymer hydrogel. A cross-linked polymer hydrogel in particles with either the particle diameters or the average particle diameter within the foregoing ranges is preferable because this facilitates efficient drying to reduce undried products. The particle diameters of the particles of the cross-linked polymer hydrogel are obtainable by classification with the use of a sieve having specific openings, in the same manner as the particle diameters (this is measured with the method described in (d) particle diameter below) of the water absorbent resin that has been pulverized. The average particle diameter is also obtained in the same manner as D50 described below. Dry classification of the cross-linked polymer hydrogels, however, is difficult. Thus, wet classification described Japanese Unexamined Patent Publication No. 2000-63527, paragraph [0091], is used in the measurement.

In the present invention, "crushing" is distinguished from "pulverizing", in which a dried product obtained by drying a crushed cross-linked polymer hydrogel is fragmented into smaller pieces to obtain a final product.

In the present invention, the cross-linked polymer hydrogel is obtained by polymerizing the monomer including the unsaturated monomer containing a carboxyl group while crushing the resulting cross-linked polymer hydrogel. Thus, no step of crushing the cross-linked polymer hydrogel with a crushing machine or the like following the polymerization is necessitated. This allows improvements in efficiency in production of the water absorbent resin.

The method is not particularly limited, as long as it includes polymerization of the monomer including the unsaturated monomer containing a carboxyl group while crushing the resulting cross-linked polymer hydrogel. An exemplary method thereof is a method including polymerization carried out concurrently with crushing in a reactor having crushing means. A preferred reactor is, for example, a reactor in which a rotary agitation blade rotates to apply shearing force to the cross-linked polymer hydrogel produced as polymerization of the monomer including the unsaturated monomer containing a carboxyl group proceeds. For this reason, it is preferable that the reactor include plural rotary agitation blades.

Examples of the reactor include single screw kneaders, single screw extruders, double-arm kneaders, and triple screw kneaders. Among those listed above, the double-arm kneaders and the triple screw kneaders are preferred, and the double-arm kneaders are more preferred.

If a double-arm kneader is to be used, it is preferable to use the kneader in such a manner that two rotary agitation blades are rotated in the opposite directions either at the same speed or at respective speeds. If the blades are to be rotated at the uniform speed, the kneader is used with respective gyration radius of the two rotary agitation blades overlapping each other. If the blades are to be rotated at the respective speeds, the kneader is used with the radius gyrations of the two rotary agitation blades not overlapping each other.

The shape of the rotary agitation blade is not particularly limited. For example, rotary agitation blades of sigma-type, S-type, bunbury-type, fishtail-type and the like are usable suitably.

Further, continuous kneaders by which the monomer including the unsaturated monomer containing a carboxyl group (preferably an aqueous solution thereof) is fed continuously and/or the cross-linked polymer hydrogel produced is released continuously are also usable suitably as the reactor discussed above. This enables continuous polymerization. Further, it is preferable that the continuous kneader have plural rotary agitation shafts.

Examples of the continuous kneader having plural rotary agitation shafts include: triple screw kneaders (kneader ruder) having two agitation blades and one release screw; dual-screw extruder-kneaders; and dual-screw extruder-mixers. In view of producing high-performance water absorbent resin at high productivity, it is preferable that the continuous kneader having the plural rotary agitation shafts be a continuous kneader including two rotary agitation shafts and having piston-flowability, by which the monomer including the unsaturated monomer containing a carboxyl group (preferably an aqueous solution thereof) is fed continuously and the cross-linked polymer hydrogel produced is released continuously. For example, it is possible to favorably use a mixer type kneader (product of LIST (Switzerland): e.g., ORP250 Contikneter and the like) described in Japanese Translation of PCT International Application Tokuhyo 2003-514961 and Japanese Translation of PCT International Application Tokuhyo 2004-511633.

In the present step, it is possible to carry out bulk polymerization or precipitation polymerization to polymerize the monomer including the unsaturated monomer containing a carboxyl group. In view of properties of the water absorbent resin obtained, it is more preferable to carry out aqueous solution polymerization using the monomer including the unsaturated monomer containing a carboxyl group as the aqueous solution. If the monomer including the unsaturated monomer containing a carboxyl group is to be used as the aqueous solution, the concentration of the monomer including the unsaturated monomer containing a carboxyl group in the aqueous solution (carboxyl-group-containing unsaturated monomer aqueous solution) is determined according to the temperature of the aqueous solution and the monomer including the unsaturated monomer containing a carboxyl group. The concentration is not particularly limited. For example if the polymerization is to be carried out using the unsaturated monomer containing a carboxyl group that is neutralized in advance (neutralizing polymerization), it is preferable that the concentration be from 10 to 70 weight % inclusive, preferably from 20 to 60 weight % inclusive, and more preferably from 30 to 50 weight % inclusive. This makes it possible to suitably crush the cross-linked polymer hydrogel obtained. Further, it is also possible, if necessary, to concomitantly use a solvent other than water in the aqueous solution polymerization. The type of the solvent to be used concomitantly is not particularly limited.

Specifically, although the use of water alone as the polymerization solvent is preferable, it is also possible to use, if necessary, a hydrophilic organic solvent, such as methanol, ethanol, isopropanol, acetone, dimethyl formamide, and dimethylsulfoxide, by adding it to the water.

In the present step, the following are usable as the initiator that is utilized to polymerize the monomer including the unsaturated monomer containing a carboxyl group: radical polymerization initiators such as potassium persulfate, ammonium persulfate, sodium persulfate, potassium peracetic, sodium peracetic, potassium percarbonate, sodium percarbonate, t-butylhydroperoxide, hydrogen peroxide, 2,2'-azobis(2-amidinopropane)dihydrochloride and the like; photopolymerization initiators such as 2-hydroxy-2-methyl-1-phenyl-propane-1-one and the like. The foregoing polymerization initiators are usable either alone or in combination of two or more types. Further, if a peroxide is to be used as the polymerization initiator, it is possible to carry out oxidation-reduction (redox) polymerization with the concomitant use of a reducing agent, such as sulfite, bisulfite, L-ascorbic acid and the like.

In view of properties of the water absorbent resin to be obtained, it is preferable that the usage of the polymerization initiator be from 0.001 mol % to 2 mol % inclusive, preferably from 0.01 mol % to 0.1 mol % inclusive, with respect to the whole monomer. The usage of the polymerization initiator of 0.001 mol % or above is preferable because this allows unreacted residual monomers to decrease sufficiently. Further, the usage of the polymerization initiator of 2 mol % or below is preferable because this allows the polymerization to be controlled suitably. The monomer here is (a) the unsaturated monomer containing a carboxyl group in a case where neither of the other monomer and graft polymer that are described below is to be used, or (b) the unsaturated monomer containing a carboxyl group and the other monomer or the graft polymer, both of which are described below, in a case where the other monomer or the graft polymer is to be used.

To initiate the polymerization, the polymerization initiator is usable. Besides the polymerization initiator, an active energy ray, such as ultraviolet rays, electron beams, and γ rays, is usable either alone or in combination with the polymerization initiator.

It is preferable that the temperature at the time of polymerization be from 0° C. to 120° C. inclusive, preferably from 10° C. to 100° C. inclusive, and more preferably from 20° C. to 90° C. inclusive, although it depends on the type of the solvent used. With the temperature of 120° C. or lower at the time of polymerization, only internal cross-linking by the internal cross-linking agent (A) proceeds in the polymerization, while a reaction of the functional group and the carboxyl group, which reaction occurs at a higher temperature and can form an ester bond or an amide bond as a result of reaction of the functional group with the carboxyl group, does not occur substantially in the polymerization. It is thus possible to carry out the crushing in a state in which the degree of cross-linking of the cross-linked polymer hydrogel is low. This makes it possible to solve the problem of undried products.

Further, a polymerization period is not particularly limited, but it is preferable that the polymerization period be from 30 seconds to 60 minutes inclusive, preferably from 2 minutes to 40 minutes inclusive. The polymerization period of 60 minutes or shorter is preferable because this makes it possible to avoid deterioration in properties of the water absorbent resin obtained. The polymerization period here implies a period from the time when the polymerization initiator is added to the monomer including the unsaturated monomer containing a carboxyl group to the time when the cross-linked polymer hydrogel is removed from the reactor. It is preferable that a conversion rate of the monomer be 90% or above at the time when the cross-linked polymer hydrogel is removed from the reactor, that is to say, at the end of the polymerization period.

Further, it is preferable that the water content in the cross-linked polymer hydrogel obtained in the present step be from 10% to 70% inclusive, preferably from 20% to 60% inclusive. With the percentage of water content falling within the foregoing ranges, it becomes possible to suitably fragment the cross-linked polymer hydrogel into small pieces by carrying out the crushing during the polymerization. Further, the percentage of the water content of 60% or below is preferable because this makes it possible to carry out the drying suitably without requiring much time to dry at the following step of drying.

In the present step, it is possible to use a chain transfer agent if necessary. This makes it possible to obtain a water absorbent resin having high absorption power and excellent stability against urine.

The chain transfer agent is not particularly limited, as long as it is soluble in water or monomer, and examples thereof include thiols, thiol acids, secondary alcohols, amines, and hypophosphites. Concretely, one or more than one type of water-soluble chain transfer agent selected from the group consisting of mercaptoethanol, mercaptopropanol, dodecylmercaptan, thioglycols, thiomalic acid, 3-mercaptopropionic acid, isopropanol, sodium hypophosphate, formic acid, and their salts is used. Use of a hypophosphite such as a sodium hypophosphite is preferable in view of the effect to be produced thereby.

The usage of the chain transfer agent is from 0.001 mol % to 1 mol % inclusive with respect to the whole monomer, preferably from 0.005 mol % to 0.3 mol % inclusive, although it depends on the type and the usage of the chain transfer agent and the concentration of the monomer in the monomer aqueous solution. The usage of 0.001 mol % or more is preferable because this does not cause the centrifugal retention capacity to become too low. Further, the usage of 1 mol % or less is preferable because this causes neither increase in the extractable polymer content nor decrease in stability.

<Unsaturated Monomer Containing a Carboxyl Group>

In view of water absorption property, the water absorbent resin obtained by polymerizing the unsaturated monomer containing a carboxyl group is produced in the present invention. Further, the unsaturated monomer containing a carboxyl group serves also as a monomer containing a group which becomes a carboxyl group such as an acrylic nitrile after polymerization, as a result of hydrolysis carried out after the polymerization in the present invention. Use of the unsaturated monomer containing a carboxyl group at the time of polymerization is more preferable.

Examples of the unsaturated monomer containing a carboxyl group at the time of polymerization include (meth) acrylic acid, maleic acid anhydride, maleic acid, fumaric acid, crotonic acid, itaconic acid, cinnamic acid, β-acryloyloxypropionic acid, and their alkali metal salts, alkaline earth metal salts, ammonium salts, and alkylamine salts. The unsaturated monomers containing carboxyl groups are usable either alone or in the form of a mixture of two or more types.

Among the above-listed unsaturated monomers containing carboxyl groups, the monomer containing the acrylate or similar monomer as a main ingredient is preferable because the use thereof allows further improvements in water absorption property or safety of the water absorbent resin obtained. The acrylate or similar monomer is an acrylic acid and/or a water-soluble salt of the acrylic acids.

Further, the water-soluble salt of the acrylic acids is alkali metal salts, alkaline earth metal salts, ammonium salts, hydroxyammonium salts, amine salts, or alkylamine salts of the acrylic acids, with the rate of neutralization in the range of 100 mol % to 0.1 mol % inclusive, preferably in the range of 90 mol % to 50 mol % inclusive, more preferably in the range of 80 mol % to 60 mol % inclusive. The alkali metal salt is preferable, and the sodium salt and the potassium salt are especially preferable, among the water-soluble salts listed above. It is possible to carry out neutralization of the carboxyl group to form the salts, either in the state of a monomer before the polymerization, or in the state of a polymer during or after the polymerization. It is also possible to carry out the neutralization by combining them. A rate of neutralization of the carboxyl group in the water absorbent resin is calculable on the basis of the amount of unneutralized unsaturated monomer containing a carboxyl group and the total amount of bases used in neutralization before, during, and/or after the polymerization. The rate is also obtainable by extracting the soluble part of the water absorbent resin and then titrating.

The acrylate monomer is usable either alone or in combination of two or more types. The average molecular weight (degree of polymerization) of the water absorbent resin is not particularly limited.

In the present step, it is possible to copolymerize other monomer in combination with the unsaturated monomer containing a carboxyl group, to the extent that the effect of the present invention is not to be inhibited.

Other concrete examples of the monomers to be used in combination include: (meth) acrylic acid esters such as methyl(meth)acrylate, ethyl(meth)acrylate, and buthyl(meth) acrylate; hydrophobic monomers such as vinyl acetate and vinyl propionate; acid group containing monomer, such as 2-(meth)acryloylethane sulfonic acid, 2-(meth)acryloylpropanesulfonic acid, 2-(meth)acrylamide-2-methylpropanesulfonic acid, vinyl sulfonic acid, styrenesulfonic acid, allylsulfonic acid, vinylphosphonic acid, 2-(meth) acryloyloxyethylphosphoric acid, (meth)acryloxyalkanesulfonic acid, and their alkali metal salts, alkaline earth metal salts, ammonium salts, and alkylamine salts; dialkylaminoalkyl(meth)acrylates such as N,N-dimethylaminoethyl (meth)acrylate, N,N-dimethylaminopropyl(meth)acrylate, and N,N-dimethylaminopropyl(meth)acrylamide, and quaternized products thereof (e.g. reactant with alkylhydride, reactant with dialkyl sulfuric acid); dialkylaminohydroxyalkyl(meth)acrylates and quaternized products thereof; hydroxyalkyl(meth)acrylates, such as hydroxymethyl(meth) acrylate, 2-hydroxyethylmethacrylate, and 2-hydroxypropyl (meth)acrylate; acrylamide, methacrylamide, N-ethyl(meth) acrylamide, N-n-propyl(meth)acrylamide, N-isopropyl (meth)acrylamide, N,N-dimethyl(meth)acrylamide; and alkoxypolyethyleneglycol(meth)acrylate such as methoxypolyethyleneglycol(meth)acrylate and polyethyleneglycolmono(meth)acrylate. The foregoing copolymerizing monomers are usable either alone or in the form of a mixture of two or more types.

In the present step, it is possible to polymerize the unsaturated monomer containing a carboxyl group with the polymer for graft polymerization, e.g., polyvinyl alcohol, starch, and cellulose ether, to the extent that the effect of the present invention is not to be inhibited.

If the foregoing other monomer and/or polymer for graft polymerization are to be used, the respective usages are preferably 0 to 50 mol %, more preferably 0 to 30 mol %, still more preferably 0 to 10 mol %, particularly preferably 0 to 5 mol %, most preferably 0 to 1 mol %, with respect to the total amount of the other monomer and/or polymer for graft polymerization and the unsaturated monomer containing a carboxyl group in which unsaturated monomer is used as a main ingredient. This further improves water absorption properties of the finally obtained water absorbent resin and the final water absorbing agent.

<Internal Cross-Linking Agent>

An internal cross-linking agent (A) for use in the present invention only needs to be an internal cross-linking agent having at least two radical polymerizable unsaturated groups in its single molecule. The internal cross-linking agent (A) is polymerized simultaneously under conditions where the monomer including the unsaturated monomer containing a carboxyl group is polymerized, so that an internal cross-link is formed by the internal cross-linking agent (A).

Specific examples of the internal cross-linking agent (A) having at least two radical polymerizable unsaturated groups in its single molecule include N,N'-methylene bis(meth)acrylamide, (poly)ethylene glycol di(meth)acrylate, (poly) propylene glycol di(meth)acrylate, trimethylolpropane tri(meth) acrylate, trimethylolpropane di(meth)acrylate, glycerin tri (meth)acrylate, glycerin acrylate methacrylate, ethylene oxide modified trimethylolpropane tri(meth)acrylate, pentaerythritol tetra(meth)acrylate, pentaerythritol hexa(meth) acrylate, triallyl cyanurate, triallyl isocyanurate, triallyl phosphate, triallyl amine, poly(meth)allyloxyalkane, N,N'-diallyl acrylamide, diallyloxy acetic acid, and bis(N-vinyl carboxylic amide). These internal cross-linking agents (A) may be used separately, or two or more of them may be appropriately used in combination.

Above all, it is preferable that the internal cross-linking agent (A) has an ethyleneoxide chain in its molecule, and it is particularly preferable that the internal cross-linking agent (A) is (poly)ethylene glycol di(meth)acrylate.

Further, an internal cross-linking agent (B) for use in the present invention is a non-polymeric internal cross-linking agent having in its single molecule at least two functional groups each of which allows formation of an ester bond or an amide bond by reacting with a carboxyl group. Examples of the functional groups include not only a functional group that forms an ester bond or an amide bond with a carboxyl group, but also a functional group that does not form an ester bond or an amide bond directly with a carboxyl group but forms an ester bond or amide bond as a result of reacting with a carboxyl group. Examples of such internal cross-linking agent (B) include an internal cross-linking agent that is decarbonated by heating so as to have functional groups which form an ester bond or an amide bond with a carboxyl group.

In case where an internal cross-linking agent (B) having such functional groups is used, the functional groups react with a carboxyl group within a temperature range higher than the temperature range of the polymerization reaction of the monomer including the unsaturated monomer containing a carboxyl group. For this reason, in the present polymerizing step, no internal cross-link is substantially formed by the internal cross-linking agent (B). Therefore, in the polymerizing step, the resulting cross-linked polymer hydrogel can be prevented from becoming too hard, so that crushing is satisfactorily carried out. This decreases residual large cross-linked polymer hydrogel particle pieces that will not be dried in the subsequent drying step and will remain as an undried product. Furthermore, in addition to this, an internal cross-link can be formed by the internal cross-linking agent (B) by carrying out heating in the drying step, so that a desired degree of cross-linking can be achieved.

Therefore, it is preferable that the functional groups of the internal cross-linking agent (B) react with a carboxyl group at a temperature of not less than 110° C., more preferably at a temperature of not less than 130° C., still more preferably at a temperature of not less 150° C., or particularly preferably at a temperature of 180° C. This prevents the internal cross-linking agent (B) from substantially forming an internal cross-linking in the polymerizing step in which the polymerization reaction proceeds at a temperature of less than 110° C., thereby bringing about an effect of the present invention. This decreases residual large cross-linked polymer hydrogel particle pieces that will not be easily dried in the subsequent drying step. In order to prevent the functional groups from reacting with the carboxyl group in the polymerizing step, it is preferable that the temperature at which the functional groups react with the carboxyl group be higher. However, it is preferable that the temperature at which the functional groups react with the carboxyl group be less than 300° C. The reason for this is as follows: When the internal cross-linking agent (B) forms a cross-link as a result of the reaction of the functional groups with the carboxyl group at a temperature of less than 300° C., the physical properties of the water absorbent resin can be prevented from deteriorating due to high temperatures.

Further, the internal cross-linking agent (B) only needs to have, in its single molecule, at least two functional groups each of which allows formation of an ester bond or an amide bond with a carboxyl group. However, it is more preferable that the internal cross-linking agent (B) have two or three such functional groups. With this, as compared with a case where the internal cross-linking agent (B) has four or more such functional groups, the points of cross-linking are dispersed and the distribution of cross-linking is uniform. Further, it is still more preferable that the internal cross-linking agent (B) have in its single molecule two functional groups each of which allows formation of an ester bond or an amide bond with a carboxyl group. With this, high reactivity and high efficiency in reaction are achieved.

Further, "non-polymeric" in the present invention means compounds other than polymer compounds. The "polymer compound" here means a compound which is obtained by polymerization or naturally occurs, which has repeated identical structural parts, and which has a molecular weight (weight-average molecular weight) of greater than 5000. The internal cross-linking agent (B) only needs to be non-polymeric. However, it is more preferable that the internal cross-linking agent (B) have a molecular weight of not less than 40 to not more than 500, still more preferably not less than 50 to not more than 250, or particularly preferably not less than 60 to not more than 100. In case where the internal cross-linking agent (B) is non-polymeric, as compared with a case where a polymer compound such as polyvinyl alcohol or starch is used as an internal cross-linking agent, high efficiency in cross-linking and uniform cross-linking are achieved. Furthermore, in case where the internal cross-linking agent (B) is non-polymeric, as compared with a case where a polymer compound is used as an internal cross-linking agent, the internal cross-linking agent (B) will not be easily colored when dried.

Examples of the functional groups each of which allows formation of an ester bond or an amide bond by reacting with a carboxyl group include, but are not limited to, a hydroxyl group, an amino group, cyclocarbonate, oxazolidinone, imidazolidinone, a cyclic urethane group, a cyclic urea group, and an oxetane group.

Therefore, examples of the internal cross-linking agent (B) include: an internal cross-linking agent having one type of functional group selected from the functional groups exemplified above and having two or more such functional groups; and an internal cross-linking agent having two or more types of functional group selected from the functional groups exemplified above and having a total of two or more such functional groups. Among them, it is more preferable that the internal cross-linking agent (B) be an internal cross-linking agent having two or more hydroxyl groups. In case where the internal cross-linking agent (B) is an internal cross-linking agent having plural types of functional group, the ratio of one type of functional group to another type of functional group is not particularly limited.

Further, among the hydroxyl groups, it is more preferable that the internal cross-linking agent (B) be an internal cross-linking agent having a hydroxyl group bonded to primary carbon. With this, as compared with a hydroxyl group bonded to secondary or tertiary carbon, excellent reactivity is achieved.

Specific examples of the internal cross-linking agent (B) having in its single molecule at least two functional groups each of which allows formation of an ester bond or an amide bond by reacting with a carboxyl group include: polyhydric alcohol compounds such as ethylene glycol, diethylene glycol, propylene glycol, triethylene glycol, tetraethylene glycol, polyethylene glycol, 1,3-propanediol, dipropylene glycol, 2,2,4-trimethyl-1,3-pentadiol, polypropylene glycol, (poly)glycerin, 2-butane-1,4-diol, 1,3-butanediol, 1,4-butanediol, 1,5-pentanediol, 1,6-hexanediol, 1,2-cyclohexane dimethanol, 1,2-cyclohexanol, trimethylol propane, diethanol amine, triethanol amine, polyoxypropylene, oxyethylene-oxypropylene block copolymer, pentaerithritol, erithritol, and sorbitol; polyamine compounds such as ethylenediamine, diethylenetriamine, triethylenetetramine, tetraethylenepentamine, pentaethylenehexamine, polyamide-polyamine, and polyethyleneimine; alkylene carbonate compounds such as 1,3-dioxolan-2-one, 4-methyl-1,3-dioxolan-2-one, 4,5-dimethyl-1,3-dioxolan-2-one, 4,4-dimethyl-1,3-dioxolan-2-one, 4-ethyl-1,3-dioxolan-2-one, 4-hydroxymethyl-1,3-dioxolan-2-one, 1,3-dioxane-2-one, 4-methyl-1,3-dioxane-2-one, 4,6-dimethyl-1,3-dioxane-2-one, and 1,3-dioxopane-2-one; oxazolidinone; imidazolidinone; polyisocyanate compounds such as 2,4-tolylenediisocyanate and hexamethylenediisocyanate; polyoxazoline compounds such as 1,2-ethylenebisoxazoline; and oxetane compounds such as 3-methyl-3-oxetanemethanol, 3-ethyl-3-oxetanemethanol, 3-butyl-3-oxetanemethanol, 3-methyl-3-oxetaneethanol, 3-ethyl-3-oxetaneethanol, 3-butyl-3-oxetaneethanol, 3-chloromethyl-3-methyloxetane, 3-chloromethyl-3-ethyloxetane, and multivalent oxetane compounds. These internal cross-linking agents (B) may be used separately, or two or more of them may be appropriately used in combination.

Above all, it is more preferable that the internal cross-linking agent (B) is polyol, and it is more preferable that the internal cross-linking agent (B) is polyol having one or more primary hydroxyl groups in its single molecule, more preferably, two or more primary hydroxyl groups in its single molecule.

Further, in view of the mixture with the monomer, it is preferable that the internal cross-linking agent (B) is in a liquid state at 25° C. and its boiling point is 150° C. or higher, more preferably 200° C. or higher, at $1.01325\times10^5$ Pa.

More preferable specific examples of the internal cross-linking agent (B) include: multivalent alcohol compounds such as 1,4-butanediol, 1,3-propanediol, glycerin, propyleneglycol, 1,5-pentanediol, 1,6-hexanediol; sugar alcohol compound such as pentaerithritol, erithritol, and sorbitol. Above all, the internal cross-linking agent (B) is more preferably 1,4-butanediol, 1,3-propanediol, glycerin, or propyleneglycol, particularly preferably 1,4-butanediol.

Use of the internal cross-linking agent (B) exhibits high effect as an internal cross-linking agent, so that higher performance of the water absorbent resin is expected. Further, this arrangement is preferable since it is possible to prevent the water absorbent resin from being colored by heating.

Further, for the purpose of ease of addition and formation of a uniform cross-linking, it is preferable that the internal cross-linking agent (B) be a water-soluble cross-linking agent that dissolves in 100 g of purified water by an amount of not less than 0.1 g.

Further, it is preferable that the internal cross-linking agent (B) have a functional group equivalent weight of not less than 29 and not more than 200, or more preferably not less than 35 and not more than 60. The "functional group equivalent weight" here means a value obtained by dividing (i) the molecular weight of the internal cross-linking agent (B) by (ii) the number of "functional groups each of which allows formation of an ester bond or an amide bond by reacting with a carboxyl group". It is preferable that the functional group equivalent weight be not less than 29 and not more than 200, because such a functional group equivalent weight enables efficient internal cross-linking.

If the internal cross-linking agent (B) has two or more remaining free functional groups each of which allows formation of an ester bond or an amide bond by reacting with a carboxyl group, some of the functional groups may be modified. For the purpose of hydrophilicity, physical properties, safety, and coloring after heat treatment, it is preferable that the internal cross-linking agent (B) whose functional groups are unmodified be used.

The usage of the internal cross-linking agent (A) in the present invention ranges from not less than 0.01 mol % to not more than 0.2 mol % with respect to the unsaturated monomer containing a carboxyl group.

When the usage of the internal cross-linking agent (A) is not less than 0.01 mol % with respect to the unsaturated monomer containing a carboxyl group, the ratio of the internal cross-linking agent (B) to the internal cross-linking agent (A) can be adjusted. This makes it possible to use the internal cross-linking agent (B) in a smaller amount, thereby solving such a problem that the resulting water absorbent resin has an unstable CRC after drying. Further, when the usage of the internal cross-linking agent (A) is not more than 0.2 mol % with respect to the unsaturated monomer containing a carboxyl group, the degree of cross-linking of an internal cross-link formed in the polymerizing step can be prevented from becoming too large. This results in a soft cross-linked polymer hydrogel. Such a soft cross-linked polymer hydrogel can be suitably crushed. This enables reduction in large pieces of cross-linked polymer hydrogel. This makes it possible to solve such a problem that the large pieces of hydrogel remain undried in the subsequent drying step.

Further, from the viewpoint of the amount of water absorption and the extractable polymer content, it is more preferable that the usage of the internal cross-linking agent (A) range from not less than 0.02 mol % to not more than 0.15 mol %, or still more preferably not less than 0.03 mol % to not more than 0.1 mol %.

Further, the present invention uses the internal cross-linking agents (A) and (B) so that the molar ratio (B)/(A) of the internal cross-linking agents (B) to the internal cross-linking agent (A) is not less than 0.01 and not more than 1.8. When the molar ratio (B)/(A) is not less than 0.01, it becomes possible to form a sufficient internal cross-linked structure as a whole while keeping the degree of cross-linking during polymerization at a low level. Further, when the molar ratio (B)/(A) is not more than 1.8, the usage of the internal cross-linking agent (B) can be reduced. This makes it possible to such a problem that the resulting water absorbent resin has an unstable CRC after drying.

According to a conventional technique that uses an internal cross-linking agent in which (i) an internal cross-linking agent having at least two radical polymerizable unsaturated groups in its single molecule and (ii) an internal cross-linking agent having in its single molecule at least two functional groups capable of reacting with a carboxyl group are combined in fixed proportions, the latter internal cross-linking agent is mainly used because it is advantageous in terms of the cost of increasing the usage of internal cross-linking agent for the purpose of decreasing the absorption capacity. As a matter of fact, in Patent Documents 2 to 6, the latter internal cross-linking agent is used twice as much as the former cross-linking agent in terms of molar ratio. Conventionally, there has been no such idea that a high molar ratio (B)/(A) of the internal cross-linking agent (B) to the internal cross-linking agent (A) would cause inconvenience.

The inventors discovered that the use of the producing method of the present invention realizes not only achievement of the purpose of obtaining a water absorbent resin having a reduced number of particles of undried products by performing polymerization during crushing in the presence of the internal cross-linking agents and then by drying the resulting cross-linked polymer hydrogel without further crushing after polymerization but also mitigation of the irregularities in the CRC of the resulting water absorbent resin.

The possible reasons why the irregularities in the CRC are mitigated in case where the molar ratio (B)/(A) of the internal cross-linking agent (B) to the internal cross-linking agent (A) is as small as not less than 0.01 and not more than 1.8 is as follows. In case where the molar ratio (B)/(A) of the internal cross-linking agent (B) to the internal cross-linking agent (A) is high, a large amount of internal cross-linking agent (B) which react in the subsequent drying step is used. This is believed to make it very difficult to control how much of the internal cross-linking agent (B) reacts in the subsequent drying step. In case where the reaction of the internal cross-linking agent (B) cannot be controlled, water absorbent resins having different degrees of internal cross-linkage are generated, thereby causing irregularities in water absorbency. Therefore, in case where the internal cross-lining agent (A) and the internal cross-linking agent (B) are used in combination, the internal cross-linking agent (B) which react in the subsequent drying step is used by such an amount that the molar ratio (B)/(A) is not more than 1.8. This is believed to improve the stability of the CRC of the resulting water absorbent resin.

Furthermore, the water absorbent resin produced by the method according to the present invention for producing a water absorbent resin is such that the usage of the internal cross-linking agent (A) ranges from not less than 0.01 mol % to not more than 0.2 mol % with respect to the unsaturated monomer containing a carboxyl group and the molar ratio (B)/(A) of the internal cross-linking agent (B) to the internal cross-linking agent (A) ranges from not less than 0.01 to not more than 1.8, thereby having better absorbency against a pressure of 4.83 kPa (AAP) than a water absorbent resin that falls out of the ranges. For example, Table 3, which shows the results of Examples and Comparative Examples described later, shows the AAP of the water absorbent resins of the present invention that had been surface cross-linked and damaged. As evidenced by Table 3, such water absorbent resins of Examples 4 to 6 that the usage of the internal cross-linking agent (A) ranges from not less than 0.01 mol % to not more than 0.2 mol % with respect to the unsaturated monomer containing a carboxyl group and the molar ratio (B)/(A) of the internal cross-linking agent (B) to the internal cross-linking agent (A) ranges from not less than 0.01 to not more than 1.8 exhibit higher AAP after damage than those water absorbent resins of Comparative Examples 8 to 14 which fall out of the ranges. Although there is no obvious reason for this, this shows that the present invention brings about an effect of making it possible to produce a water absorbent resin having excellent absorbency against a pressure of 4.83 kPa (AAP).

The internal cross-linking agent (A) and the internal cross-linking agent (B) only need to be present at the time of polymerizing the monomer including the unsaturated monomer containing a carboxyl group, and may be added before or during the polymerization of the monomers. Further, these internal cross-linking agents may be added in one step or stepwise to the reaction system.

(1-2) Drying Step

In the present step, the crushed cross-linked polymer hydrogel obtained in the polymerizing step is dried so as to be a dry product having a water content falling within a predetermined range. According to the method according to the present invention for producing a water absorbent resin, the cross-linked polymer hydrogel obtained in the polymerizing step is dried without being crushed by a crusher.

A drying method for use in the present step is not particularly limited as long as it is such a method that the temperature of the material in the drying step (cross-linked polymer hydrogel being dried) is not less than 110° C. Examples of the drying method include various methods such as drying by heating, hot-air drying, drying under reduced pressure, infrared drying, microwave drying, dehydration by azeotropic distillation with a hydrophobic organic solvent, and high humidity drying with use of hot vapor.

Examples of a dryer for use in the present step include box dryers; drum dryers; and band dryers such as parallel flow band-tunnel dryers and ventilation band dryers.

The drying step is normally carried out at a drying temperature of not less than 110° C., preferably not less than 130° C., more preferably not less than 150° C., or still more preferably not less than 180° C.

Drying the cross-linked polymer hydrogel at a drying temperature of not less than 110° C. makes it possible to cause an internal cross-linking reaction by the internal cross-linking agent (B) which did not react with a carboxyl group within the temperature range of the polymerizing step. Therefore, also in case where the degree of internal cross-linking at the time of polymerization is lowered by reducing the amount of internal cross-linking agent that reacts at the polymerization temperature, it becomes possible to obtain a highly cross-linked water absorbent resin by developing internal cross-linkage in the drying step.

Further, it is preferable that the drying temperature normally have au upper limit of less than 300° C., more preferably less than 250° C., or still more preferably less than 220° C. Drying the cross-linked polymer hydrogel at a drying temperature of less than 300° C. makes it possible to prevent the resulting water absorbent resin from being colored. The "drying temperature" is here defined by the temperature of a heat medium in case where oil or vapor is used as a heat medium, or defined by the temperature of the material (cross-linked polymer hydrogel being dried) in case where the cross-linked polymer hydrogel is dried without use of a heat medium (e.g., with use of irradiation of electron beams). Further, in this step, the drying temperature may be gradually changed.

Further, the drying period depends on the surface area of the cross-linked polymer hydrogel, the water content of the cross-linked polymer hydrogel, and the type of dryer, and may be selected so that a desired water content is achieved. For example, the drying period preferably ranges from 10 minutes to 120 minute, or more preferably from 30 minutes to 60 minutes. The resulting dry product is a water absorbent resin of the present invention.

Further, the water absorbent resin of the present invention encompasses not only the dry product obtained by drying the cross-linked polymer hydrogel in the drying step, but also encompasses a surface cross-linked water absorbent resin in case where the below-mentioned surface cross-linking is performed and encompasses pulverized and classified final products obtained by pulverizing and classifying the surface cross-linked water absorbent resin.

The water content of the water absorbent resin obtained by the drying step is not particularly limited. However, it is preferable the water absorbent resin be particles (powder) that exhibit(s) fluidity even at room temperature. It is more preferable that the water absorbent resin take the form of a powder having a water content of 0.2 mass % to 30 mass %, still more preferably 0.3 mass % to 15 mass %, or especially preferably 0.5 mass % to 10 mass %. When the water content is not less than the upper limit of the range, the water absorbent resin has such good fluidity as to be suitably used for producing products without problems.

Further, it is preferable that the drying step be carried out so that an amount of the internal cross-linking agent (B) remaining in the water absorbent resin obtained in the drying step is not more than $1.0\times10^{-5}$ mol/g. The water absorbent resin obtained after the drying step may contain such a residual unreacted internal cross-linking agent (B) that none of the functional groups contained in the single molecule of the internal cross-linking agent (B) having the functional groups each of which allows formation of a covalent bond with a carboxyl group has formed any bond with a carboxyl group of the water absorbent resin. The amount of residual internal cross-linking agent (B) refers to the amount of unreacted internal cross-linking agent (B) contained in the water absorbent resin. The amount of residual cross-linking agent (B) contained in the water absorbent resin can be measured by a method described in (2).

By performing drying such that the amount of residual internal cross-linking agent (B) contained in the water absorbent resin obtained in the drying step is not more than $1.0\times10^{-5}$ mol/g, the internal cross-linking agent (B) used involves efficiently in internal cross-linking, so that desired water absorption properties are obtained.

After the drying step, the centrifugal retention capacity (CRC) of the water absorbent resin which has not been subjected to the surface cross-linking step is preferably 28 g/g or more, more preferably 33 g/g or more, still more preferably 34 g/g or more, particularly preferably 36 g/g or more. Note that, an upper limit of the centrifugal retention capacity (CRC) of the water absorbent resin after the drying step and before the surface cross-linking step is preferably 50 g/g or less.

By setting the CRC of the water absorbent resin after the drying step and before the surface cross-linking step into the foregoing range, it is possible to reduce an amount of undried product and it is possible to stabilize the CRC after the drying step.

A shape of the water absorbent resin obtained by such a producing method of the present invention as described above is not limited as long as the water absorbent resin can be treated as a powder. The shape of the water absorbent resin may be a spherical shape, a fibrous shape, a rod-like shape, a substantially spherical shape, a flat shape, an indeterminate shape, a granular shape, the shape of particles having porous structures, or the like. However, an indeterminate pulverized shape is preferable.

(1-3) Surface Cross-Linking Step

In view of the physical properties of the water absorbent resin that will be produced, the method for producing a water absorbent resin in accordance with the present invention preferably involves a surface cross-linking step of mixing the water absorbent resin (dried product) obtained in the drying step with a surface cross-linking agent and heating the mixture to form surface cross-linking. Alternatively, if the dried product is pulverized and where necessary, classified (detailed later), the water absorbent resin is preferably subjected to that surface cross-linking step either before or after the pulverization and classification.

The surface cross-linking step reduces the centrifugal retention capacity (CRC) of the water absorbent resin by preferably 3 g/g or more, more preferably 5 g/g or more, to at least 26 g/g. The maximum reduction of the centrifugal retention capacity (CRC) upon the surface cross-linking is 50% the pre-surface-cross-linking centrifugal retention capacity (CRC). The 3 g/g or greater reduction of the centrifugal retention capacity (CRC) of the water absorbent resin is preferable because that yields sufficient surface cross-linking strength. The resultant centrifugal retention capacity (CRC) of 26 g/g or more is preferable because that ensures sufficient water absorbing capacity.

The surface cross-linking step preferably renders $0.1\times10^{-5}$ mol/g or less the amount of the internal cross-linking agent (B) remaining in the water absorbent resin. The water absorbent resin after the surface cross-linking may contain an amount of the unreacted internal cross-linking agent (B) in which none of the functional groups of the molecules of the internal cross-linking agent (B), which potentially could form covalent bonds with a carboxyl group, is bonded to a carboxyl group of the water absorbent resin. The amount of the internal cross-linking agent (B) remaining in the water absorbent resin refers to the amount of the unreacted internal cross-linking agent (B) contained in the water absorbent resin.

That particular amount of internal cross-linking agent (B) remaining in the water absorbent resin after the surface cross-linking is preferable because the amount enables the internal cross-linking agent (B) that remains unreacted after the drying step to further perform internal cross-linking in the present step and be consumed more efficiently in the internal cross-linking to yield the desired water absorption property.

Various surface cross-linking agents can be used in the present step. Examples in view of physical properties include polyhydric alcohol compounds, epoxy compounds, polyamine compounds, condensates of polyamine compounds with haloepoxy compounds, oxazoline compounds, monooxazolidinone compounds, dioxazolidinone compounds, polyoxazolidinone compounds, polyvalent metal salts, and alkylene carbonate compounds. Specifically, the surface cross-linking agents described as examples in the specifications of U.S. Pat. Nos. 6,228,930, 6,071,976, and 6,254,990 can be used. More specific examples of the surface cross-linking agent are polyhydric alcohol compounds, such as ethylene glycol, diethylene glycol, triethylene glycol, tetraethylene glycol, polyethylene glycol, propylene glycol, 1,3-propanediol, dipropylene glycol, 2,3,4-trimethyl-1,3-pentanediol, polypropylene glycol, glycerine, polyglycerine, 2-butene-1,4-diol, 1,4-butanediol, 1,3-butanediol, 1,5-pentanediol, 1,6-hexanediol, and 1,2-cyclohexane dimethanol; epoxy compounds, such as ethylene glycol diglycidyl ether and glycidol; polyamine compounds, such as ethylenediamine, diethylenetriamine, triethylenetetramine, tetraethylenepentamine, pentaethylenehexamine, polyethyleneimine, and polyamide polyamine; haloepoxy compounds, such as epichlorohydrin, epibromohydrin, and α-methyl epichlorohydrin; condensates of the polyamine compound and the haloepoxy compound; oxazolidinone compounds such as 2-oxazolidinone (U.S. Pat. No. 6,559,239); oxetane compounds; cyclic urea compounds; and alkylene carbonate compounds such as ethylene carbonate (U.S. Pat. No. 5,409,771). These examples are however not limiting in any particular manner. To maximize the effects of the present invention, among these surface cross-linking agents, at least one of polyhydric alcohols, the oxetane compounds (US2002/72471), and cyclic urea compounds is preferably used. More preferably, at least one of polyhydric alcohols containing 2 to 10 carbons and oxetane compounds containing 2 to 10 carbons, even more preferably a polyhydric alcohol containing 3 to 8 carbons, is used. Therefore, any one of the compounds listed as examples above may be used alone as the surface cross-linking agent; alternatively two or more of the compounds may be used together in any combination.

In the present step may be preferably used a method of cross-linking the surface with the monomer containing a cross-linking agent (Japanese Patent 2530668), a method of cross-linking the surface with a radical initiator (Japanese Unexamined Patent Publication 99211/1988 (Tokukaisho 63-99211), or a method of cross-linking the surface with a radical initiator and a monomer (US 2005-0048221).

The surface cross-linking agent is used in an amount which, albeit variable depending on the compounds being used and their combinations, falls in a preferable range from not less than 0.001 weight % to not more than 10 weight % or in a more preferable range from not less than 0.01 weight % to not more than 5 weight %, all figures given relative to the water absorbent resin.

Water is preferably used in the present step for surface cross-linking. In other words, the water absorbent resin is preferably mixed with the surface cross-linking agent and water and heated for surface cross-linking. Water is used typically in an amount which, albeit variable depending on the water content of the water absorbent resin being used, falls in a preferable range from not less than 0.5 weight % to not more than 20 weight % or in a more preferable range from not less than 0.5 weight % to not more than 10 weight %, all figures given relative to the water absorbent resin. In the present step, a hydrophilic organic solvent may be used, either in addition to the water or in place of the water, in an amount which falls in a preferable range from 0 to not more than 10 weight %, in a more preferable range from 0 to not more than 5 weight %, and in an even more preferable range from 0 to not more than 3 weight %, all figures given relative to the water absorbent resin.

An acidic substance, such as an organic acid (lactic acid, citric acid, p-toluene sulfonic acid) or an inorganic acid (phosphoric acid, sulfuric acid, sulfurous acid), a basic substance, such as caustic soda or sodium carbonate, or a polyvalent metal such as aluminum sulfate may be used together with the surface cross-linking agent in the present step, in an amount of 0 to 10 weight %, 0 to 5 weight %, or especially, about 0 to 1%, all figures given relative to the water absorbent resin.

If surface cross-linking is done in the present invention, the surface cross-linking agent is mixed in advance with water and/or a hydrophilic organic solvent. The aqueous solution or solution is then preferably sprayed or added dropwise to the water absorbent resin. Spraying is a preferred choice between the two. The average diameter of the sprayed liquid drops is preferably from 0.1 to 300 μm or more preferably from 0.1 to 200 μm.

The mixing device used to mix the water absorbent resin of the present invention with the surface cross-linking agent, water, or hydrophilic organic solvent preferably has a high mixing capability to mix the ingredients uniformly and thoroughly. Example of the mixing device include the cylindrical mixer, the double-walled conical mixer, the high-speed stirring mixer, the V-shaped mixer, the ribbon mixer, the screw mixer, the double-arm kneader, the crush kneader, the rotary mixer, the air current mixer, the turbulizer, the batch-type Lödige mixer, and the continuous Lödige mixer.

The water absorbent resin, after being mixed with the surface cross-linking agent, is preferably treated with heat. The heating temperature (temperature of a heat medium or the material itself) is preferably from 120 to 250° C., more preferably from 150 to 250° C. The heating period is preferably from 1 minute to 2 hours. These conditions are applied in a suitable combination: for example, the water absorbent resin may be heated at 180° C. for 0.1 to 1.5 hours or at 200° C. for 0.1 to 1 hours.

The heat treatment device is not limited in any particular manner provided that the device is capable of uniformly applying heat to the mixture of the surface cross-linking agent and the water absorbent resin. The device however preferably incorporates a large mixing device for uniform and thorough heat treatment. The heat treatment device may be, for example, the belt drier/heating furnace, the groove stirring drier/heating furnace, the screw drier/heating furnace, the rotary drier/heating furnace, the disc drier/heating furnace, the knead drier/heating furnace, fluidized bed drier/heating furnace, the air current drier/heating furnace, the infrared drier/heating furnace, the electron beam drier/heating furnace.

If a liquid permeability improving agent is added, the surface cross-linking may be done before, during, or after the addition of the liquid permeability improving agent as will be detailed later.

(1-4) Use of Method for Producing Water Absorbent Resin

The method for producing a water absorbing agent including a water absorbent resin and a liquid permeability improving agent by further adding a liquid permeability improving agent to a water absorbent resin obtained by the method for producing a water absorbent resin in accordance with the present invention also utilizes the present invention and is therefore encompassed by the present invention.

In other words, the method for producing a water absorbing agent in accordance with the present invention utilizes the method for producing a water absorbent resin in accordance with the present invention and further involves the step of adding a liquid permeability improving agent to the water absorbent resin.

The liquid permeability improving agent may be added before, during, or after the surface cross-linking. To achieve better effects with the present invention, however, the improving agent is preferably added separately after the surface cross-linking. If the dried product is pulverized and classified, the improving agent may be added before, during, or after the pulverization/classification.

A liquid permeability improving agent refers, throughout the specification, to an agent that improves the saline flow conductivity (SFC) of a water absorbent resin (or a water absorbing agent) having an SFC of 6, by 10 or more.

The mixing of the liquid permeability improving agent with the water absorbent resin or agent enables the water absorbent resin or agent to physically or ionically retain its liquid paths after absorption of an aqueous solution. That improves the liquid permeability.

The liquid permeability improving agent is preferably a water-soluble polyvalent metal compound or a polycationic compound and more preferably at least one compound selected from the group consisting of aluminum compounds, zirconium compounds, titanium compounds, and compounds containing amino groups. More specific examples include water-soluble polyvalent metal compounds, such as aluminum sulfate, potassium alum, ammonium alum, sodium alum, aluminum (poly)chloride, and their hydrates; polycationic compounds, such as polyethyleneimine, polyvinyl amine, and polyallylamine; and water-insoluble inorganic fine particles, such as silica, alumina, and bentonite. Any one of these substances may be used alone; alternatively two or more of them may be used together in any combination. Among them, aluminum sulfate, potassium alum and like water-soluble polyvalent metal salts are especially preferred because they can further improve the saline flow conductivity (SFC). The liquid permeability improving agent is preferably soluble in water for easy, uniform applicability across the surface of the water absorbent resin and absence of segregation of the liquid permeability improving agent or similar disadvantage.

The liquid permeability improving agent is used in a ratio of preferably 0.001 to 10 weight %, and more preferably 0.01 to 5 weight %, relative to the water absorbent resin.

The liquid permeability improving agent may be capable of improving the liquid permeability of the water absorbing agent and preferably does not covalently bond to functional groups on the surface of the water absorbent resin.

The liquid permeability improving agent may be added by any method including dry blending or thermal fusion or in the form of an aqueous solution or dispersion liquid.

To describe the methods in more detail, dry blending is a method for uniformly mixing the liquid permeability improving agent (polyvalent metal compound in solid powder form or inorganic fine particles) with the water absorbent resin particles obtained by the drying/pulverization. After the mixing, an aqueous solution, such as water or a polyhydric alcohol, may be further added and mixed if necessary. The mixture may also be heating. The "addition as an aqueous solution" is a method of adding and mixing an aqueous solution of the improving agent, such as a polyvalent metal compound or a polycationic compound, with the water absorbent resin particles. Preferably, the polyvalent metal or polycationic compound preferably has a relatively high concentration. The mixture may be heated if necessary. Thermal fusion is a method of melting and fixing a polyvalent metal hydrate, such as aluminum sulfate, potassium alum, ammonium alum, or sodium alum, to the water absorbent resin particles by mixing the polyvalent metal hydrate with the water absorbent resin particles and either simultaneously or subsequently heating the mixture, or mixing the polyvalent metal hydrate with the water absorbent resin particles that are heated in advance.

Water may be added before the heating if necessary.

(1-5) Other Steps

The method for producing a water absorbent resin in accordance with the present invention may further involve an aqueous-monomer-solution preparation step, carried out subsequent to the polymerization step, of preparing an aqueous solution of monomer containing the internal cross-linking agents (A) and (B) and the monomer including the unsaturated monomer containing a carboxyl group.

The method for producing a water absorbent resin in accordance with the present invention may further involve a pulverization step, carried out subsequent to the drying step or the surface cross-linking step, of further pulverizing the dried product or the water absorbent resin after the surface cross-linking step. The conditions under which the dried product is pulverized is not limited in any particular manner: a roll mill, hammer mill, or like conventional pulverizer may be used. The pulverization preferably produces particles of irregularly pulverized shape. More preferably, some of the particles are agglomerated and have a large surface area.

The pulverized water absorbent resin particles may be further subjected to, for example, classification to adjust the weight average particle diameter and logarithmic standard deviation ($\sigma\zeta$) to fall in a desired range, thereby obtaining an end product.

To carry out classification in the present invention if necessary, the sieves used in the classification need to be selected, considering efficiency of the classification. For example, it is difficult to completely remove particles having particle diameters of 150 μm or less from the water absorbent resin particles or water absorbing agent by using a sieve with 150-μm openings. A suitable type of sieve is preferably selected for use, to obtain water absorbent resin particles or a water absorbing agent having an intended particle diameter.

(2) Water Absorbent Resin in Accordance with the Present Invention and its Usage The present invention encompasses a water absorbent resin, having an internal cross-linked structure and its surface being cross-linked, which is obtained by polymerization of a monomer including an unsaturated monomer containing a carboxyl group. The internal cross-linked structure of the water absorbent resin contains an internal cross-linking agent (A) having at least two or more radical polymerizable unsaturated groups in its single molecule and a non-polymeric internal cross-linking agent (B) having in its single molecule two or more functional groups capable of forming an ester bond or an amide bond in a reaction with a carboxyl group. The ratio of agent (A) to the unsaturated monomer containing a carboxyl group is from 0.01 mol % to 0.2 mol %, inclusive. The molar ratio of agent (B) to agent (A), (B)/(A), is from 0.01 to 1.8, inclusive.

In the present invention, the water absorbent resin is a water-swelling, water-insoluble cross-linked polymer capable of forming a hydrogel. Generally, "water swelling" refers to the ability of a substance of absorbing water at a rate of, for example, at least 5 or more times the weight of the substance in ion-exchanged water. The rate is preferably 10 or more times, more preferably 20 or more times, and even more preferably as much as 50 to 1000 times the weight. In other words, the "water-swelling" cross-linked polymer can be defined as having a "water absorption rate in ion-exchanged water" of at least 5, preferably at least 10, more preferably at least 20, and even more preferably from 50 to 1000. The "water absorption rate in ion-exchanged water" is a value obtained by the same measurement as the measurement of centrifugal retention capacity (CRC) which will be detailed later, except that 0.020 g of a water absorbent resin is used as a sample and the measurement is conducted in ion-exchanged water.

A water absorbent resin being "water insoluble" refers to the uncross-linked, extractable polymer content (water-soluble polymer) of the water absorbent resin being from 0 to 50 weight % of the weight of the entire water absorbent resin, preferably from 0 to 25 weight %, more preferably from 0 to 20 weight %, even more preferably from 0 to 15 weight %, and yet more preferably from 0 to 10 weight %, all inclusive. The uncross-linked, extractable polymer content of the water absorbent resin is defined as the value measured by the following method.

A plastic container with a lid with a 250 mL capacity is charged with 184.3 g of physiological saline (0.9 weight % aqueous solution of sodium chloride). 1.00 g of the water absorbent resin is added to the aqueous solution and stirred for 16 hours to extract the soluble content of the resin. The liquid extract is filtered through a single sheet of filtering paper (JIS P 3801 No. 2, available from Advantec Toyo Kaisha, Ltd.: thickness=0.26 mm, retainable particle diameter=5 μm). 50.0 g of the obtained filtrate is set aside by measurement as a sample solution. First, a 0.1 N NaOH aqueous solution is added to the physiological saline alone, up to pH=10. Then, a 0.1 N HCl aqueous solution is added to up to pH=2.7 to determine a blank titer ([bNaOH] mL, [bHCl] mL). The same titration process is performed on the sample solution to determine a titer ([NaOH] mL, [HCl] mL). For example, in the case of a water absorbent resin made of an acrylic acid and its sodium salt of known amounts, the soluble content of the water absorbent resin can be calculated according to the following equation from the average molecular weight of the monomer and the titer determined by the foregoing process. If the water absorbent resin was made of an acrylic acid and its sodium salt of unknown amounts, the average molecular weight of the monomer can be calculated based on the neutralization ratio determined by the titration.

$$\text{Soluble Content (weight \%)}=0.1\times\text{Average Molecular Weight}\times184.3\times100\times([\text{HCl}]-[b\text{HCl}])/1000/1.0/50.0$$

$$\text{Neutralization Ratio (mol \%)}=[1-([\text{NaOH}]-[b\text{NaOH}])/([\text{HCl}]-[b\text{HCl}])]\times100$$

The water absorbent resin in accordance with the present invention can be polymer obtained by polymerization of an unsaturated monomer containing a carboxyl group. Another monomer may however be used, in the copolymerization together with the unsaturated monomer containing a carboxyl group, in an amount that does not disrupt effects of the present invention. The water absorbent resin in accordance with the present invention can be any polymer obtained in this manner. See (1) above for description of the unsaturated monomer containing a carboxyl group and the other monomer; the description is not duplicated here.

The water absorbent resin of the present invention is internally cross-linked, and the internal cross-linked structure includes the internal cross-linking agent (A) and the internal cross-linking agent (B). The internal cross-linking agent (A), the internal cross-linking agent (B), an amount of the internal cross-linking agent (A), and the molar ratio (B)/(A) between (A) and (B) are not explained here, because they have already been explained in (1).

The internal cross-linking agent (A) is copolymerized with an unsaturated monomer including a carboxyl group, in the water absorbent resin.

The aforesaid functional group in the internal cross-linking agent (B) is covalently bonded to the carboxyl group of the water absorbent resin, but not all of the aforesaid functional groups in a single molecule are required to be covalently bonded to the carboxyl group in the water absorbent resin. Some of the functional groups in a single molecule may exist as free groups, without being covalently bonded to the carboxyl group in the water absorbent resin.

In the water absorbent resin of the present invention, there may be an unreacted internal cross-linking agent (B) in which none of the functional groups in a single molecule of the internal cross-linking agent (B), which has the functional groups being cross-linkable with a carboxyl group, is bonded to a carboxyl groups in the water absorbent resin. An amount of such unreacted internal cross-linking agent (B) in the water absorbent resin, i.e. an amount of the internal cross-linking agent (B) remaining in the water absorbent resin is preferably not larger than $0.1\times10^{-5}$ mol/g. When the remaining amount of the internal cross-linking agent (B) is not larger than $0.1\times10^{-5}$ mol/g, the effect of the cross-linking is sufficient and the properties such as SFC are high.

The quantity of the unreacted internal cross-linking agent (B), i.e. the quantity of the unreacted internal cross-linking agent (B) in the water absorbent resin can be determined by extracting the agent from the water absorbent resin and analyzing the extract by liquid chromatography (LC) or the like. The method of the extraction is not particularly limited, and hence a conventional well-known method can be suitably used. An example of the method of the extraction is such that 1 gram of water absorbent resin is stirred in a 0.9 weight % of sodium chloride solution for not shorter than 2 hours, the sodium chloride solution after the stirring is filtrated, and the extracted liquid obtained as a result of the filtering is analyzed by liquid chromatography.

An internal cross-linking agent (B) in which at least one of the function groups in a single molecule of the agent is bonded to a carboxyl group can be quantified by hydrolyzing the water absorbent resin and analyzing the resulting liquid by gas chromatography-mass spectrometry (GC-MS) or the like.

The water absorbent resin of the present invention is surface cross-linked. The type and amount of the surface cross-linking agent have already been explained in (1), and hence the explanations are omitted.

The present invention encompasses a water absorbing agent including the water absorbent resin of the present invention as a main component, because the agent utilizes the present invention. The water absorbing agent of the present invention is an aqueous liquid absorbing and solidifying agent which includes the water absorbent resin of the present invention as a main component, and includes a small amount of additive if necessary, and water in some cases. The "main component" in this case indicates that the content of the water absorbent resin is not lower than 50 weight % of the entirety of the water absorbing agent. The content of the water absorbent resin in the entirety of the water absorbing agent is preferably not lower than 60 weight %, more preferably not lower than 80 weight %, more preferably not lower than 90 weight %, still more preferably not lower than 95 weight %, and most preferably not lower than 98 weight %.

Examples of the water absorbing agent of the present invention include a water absorbing agent including the water absorbent resin of the present invention and a liquid permeability improving agent. The type and amount of the liquid permeability improving agent have already been explained in (1), and hence the explanations thereof are omitted.

As additives, the water absorbing agent of the present invention may further include, if necessary, deodorant agents, antibacterial agents, perfumes, foaming agents, colorants, dyes, plasticizers, adhesives, surfactants, fertilizers, oxidizers, reducing agents, water, salts, chelating agents, disinfectants, hydrophilic polymers such as polyethyleneglycol, paraffin, hydrophobic polymers, thermoplastic resin such as polyethylene and polypropylene, thermosetting resin such as polyester resin and urea resin, or the like, on condition that the absorbency properties of the water absorbing agent are not deteriorated, for example, about 0 to 10 weight % of the aforesaid substance may be included in the water absorbent resin.

The shapes of the water absorbent resin and the water absorbing agent of the present invention are not particularly limited. Preferably the aforesaid resin and agent are fragmented by crushing in the polymerization process, and further preferably the resin and agent are pulverized and classified in the subsequent step so as to have a particular particle diameter. Preferably the water absorbent resin and the water absorbing agent of the present invention have the particles with a particle diameter of less than 850 μm and not less than 150 μm (defined by classification by using sieve: JISZ8801-1:2000) account for not lower than 90 weight % of the total. More preferably, the particles with a particle diameter of less than 850 μm and not less than 150 μm account for 95 weight % of the total. Still more preferably the particles with a particle diameter of less than 850 μm and not less than 150 μm account for 98 weight % of the total. Also, preferably the particles with a particle diameter of not less than 300 μm account for 60 weight % of the total. The "total" in this case indicates the entirety of the particle water absorbent resin as to the particle diameter of the water absorbent resin, or indicates the entirety of the water absorbing agent as to the particle diameter of the water absorbing agent.

The weight average particle diameter (D50) of the water absorbent resin or the water absorbing agent is preferably 200 to 850 μm, more preferably 200 to 600 μm, still more preferably 300 to 600 μm, and particularly preferably 300 to 500 μm. The particle diameters of the water absorbent resin and the water absorbing agent may be adjusted by granulation, according to need.

Non-limiting examples of the form of the particles of the water absorbent resin and the water absorbing agent include a spherical shape, a pulverized shape, and an irregularly pulverized shape. An irregularly pulverized shape as a result of a pulverizing step is preferable.

In the water absorbent resin and water absorbing agent of the present invention, logarithmic standard deviation ($\sigma\zeta$) of particle diameter distribution is preferably 0.1 to 0.45, more preferably 0.25 to 0.45, and still more preferably 0.30 to 0.40. The smaller the logarithmic standard deviation ($\sigma\zeta$) of particle diameter distribution is, the narrower the particle diameter distribution is. However, in the water absorbent resin and water absorbing agent, the particle diameter distribution is required to be not only narrow but also wide to some degree. When the logarithmic standard deviation ($\sigma\zeta$) is less than 0.1, while a desired performance may not be achieved, the productivity is significantly decreased. When the logarithmic standard deviation (σζ) is more than 0.45, the particle diameter distribution is so wide that a desired performance may not be achieved.

In the present invention, "particles of not less than 300 μm" indicate particles remaining on a JIS standard sieve having the mesh size of 300 μm after the classification by the below-mentioned sieve classification method. Also, "particles of less than 300 μm" indicates particles passed through a sieve having the mesh size of 300 μm, after the classification by the below-mentioned sieve classification method. The same holds for other mesh sizes. If 50 weight % of particles is classified by a sieve having the mesh size of 300 μm, the weight average particle diameter (D50) is 300 μm.

The centrifugal retention capacity (CRC) of the water absorbent resin and water absorbing agent of the present invention is preferably not lower than 5 g/g. This is preferable because, when the water absorbent resin and water absorbing agent of the present invention are used in a sanitary material such as a diaper, the capabilities of absorption and retention of aqueous solution are good. The centrifugal retention capacity (CRC) of the water absorbent resin and water absorbing agent of the present invention is preferably not lower than 5 g/g and not higher than 50 g/g, more preferably not lower than 15 g/g and not higher than 45 g/g, still more preferably not lower than 26 g/g and not higher than 40 g/g, and particularly preferably not lower than 27 g/g and not higher than 35 g/g. The centrifugal retention capacity (CRC) of not lower than 26 g/g is preferable because the quantity of the water absorbing agent to be used is small.

The saline flow conductivity (SFC), which is an evaluation of the liquid permeability of the water absorbent resin and water absorbing agent of the present invention, is not lower than 10 $cm^3 \cdot s \cdot 10^{-7}/g$, preferably not lower than 30 $cm^3 \cdot s \cdot 10^{-7}/g$, more preferably not lower than 50 $cm^3 \cdot s \cdot 10^{-7}/g$, still more preferably not lower than 70 $cm^3 \cdot s \cdot 10^{-7}/g$, and particularly preferably not lower than 100 $cm^3 \cdot s \cdot 10^{-7}/g$. The upper limit, which is not particularly restricted, is preferably not higher than 3000 $cm^3 \cdot s \cdot 10^{-7}/g$, and more preferably not higher than 2000 $cm^3 \cdot s \cdot 10^{-7}/g$. When the saline flow conductivity (SFC) is lower than 10 $cm^3 \cdot s \cdot 10^{-7}/g$, leakage may occur because an aqueous solution such as urine is not easily diffused in the absorbing article and hence the solution is not easily absorbed by the absorbing article.

In the present invention, "liquid permeability" indicates a liquid permeability state under pressure after the water absorbent resin and water absorbing agent absorb water and swell under pressure, i.e. liquid permeability under pressure between swelling gel particles. The liquid permeability is therefore a liquid permeability model of a disposable diaper at the time of practical use.

In the water absorbent resin and water absorbing agent of the present invention, its absorbency against pressure (AAP) of 4.83 kPa is preferably not lower than 8 g/g. This is preferable because, when the water absorbent resin and water absorbing agent of the present invention are used in a sanitary material such as a diaper, the capabilities of absorption and retention of aqueous solution are good. In consideration of the capabilities of absorption and retention of aqueous solution, the absorbency against pressure (AAP) of 4.83 kPa is preferably not lower than 8 g/g and not higher than 30 g/g, more preferably not lower than 16 g/g and not higher than 30 g/g, still more preferably not lower than 20 g/g and not higher than 28 g/g, particularly preferably not lower than 22 g/g and not higher than 28 g/g, and most preferably not lower than 24 g/g and not higher than 28 g/g. When the absorbency against pressure (AAP) of 4.83 kPa is less than 8 g/g, if a load such as body weight is exerted onto the particulate water absorbent resin composition or the water absorbing agent, the liquid in the absorbent and/or sanitary material is not diffused and blocking of the liquid occurs, on account of the inferior liquid diffusion and absorbency. Therefore problems such as leakage and skin rash occur at the time of practical use of a disposable diaper.

The water absorbent resin and water absorbing agent of the present invention exert excellent centrifugal retention capacity (CRC), saline flow conductivity (SFC), and absorbency (AAP) even after being damaged, as illustrated by the following example. The centrifugal retention capacity (CRC), saline flow conductivity (SFC), and absorbency (AAP) of the water absorbent resin and water absorbing agent of the present invention after being damaged also preferably fall within the aforesaid ranges.

The water absorbing agent of the present invention excels in absorbent properties such as the centrifugal retention capacity (CRC) and the absorbency against pressure (AAP) of 4.83 kPa. Therefore, the water absorbing agent of the present invention is preferably used as an aqueous liquid absorbing and solidifying agent (absorbing gelatinizer) for urine, blood and so on, for sanitary materials such as a disposable diaper, a sanitary napkin, and an incontinence pad.

For sanitary materials, the water absorbing agent of the present invention is, typically in the form of particles, combined with a hydrophilic fiber and molded as an absorbent core. An example of the fiber is a hydrophilic fiber such as crushed wood pulp. Other examples include a cotton linter, a cross-linked cellulose fiber, rayon, cotton, wool, acetate, and vinylon. These fiber materials are preferably aerated.

While not limited to sanitary materials, the water absorbing agent of the present invention can be used as conventional water absorbent resin for an agriculture/horticulture, a cable-waterproofing agent, civil engineering and construction purposes, and foods.

EXAMPLES

Through the following example and comparative example, the present invention is further described. It is noted that the present invention is not limited to them.

A method of measurement and a method of evaluation in the example and the comparative example will be explained. Unless otherwise stated, the measurement and the evaluation below were conducted in the conditions of the temperatures within the range of 20 to 25° C. and the humidity of 50 RH %.

The target of the measurement and evaluation below may be a water absorbent resin or a water absorbing agent. Therefore, if the target is a water absorbing agent, measurement is carried out while "water absorbent resin" in the description of the method is read as "water absorbing agent".

(a) Centrifugal Retention Capacity (CRC)

0.200 g of water absorbent resin was evenly contained in a bag (60 mm×60 mm) made of a nonwoven fabric (Heatron Paper made by Nangoku Pulp Kogyo Co., Ltd.: model type is GSP-22). Thereafter, the bag was soaked in physiological saline (0.9 weight % sodium chloride solution). The bag was withdrawn 30 minutes later. By using a centrifugal separator (centrifugal machine made by KOKUSAN Corporation: model type is H-122), the bag was drained for three minutes at a centrifugal force of 250 G (250 cm/s2), and a weight W1 (g) of the bag was measured. Further, the same operation was performed without using the water absorbent resin, and a weight W0 (g) was measured. Then, from the weights W1 and W0, a centrifugal retention capacity (CRC) (g/g) was calculated according to the following equation.

$$CRC\ (g/g)=[(W1\ (g)-W0\ (g))/\text{weight of water absorbent resin (g)}]-1$$

(b) Absorbency Against Pressure (AAP) of 4.83 kPa

The absorbency against pressure (AAP) of 4.83 kPa represents an absorbency at which saline (0.9 weight % sodium chloride solution) is absorbed for 60 minutes under a pressure of 4.83 kPa.

By using an apparatus shown in FIG. 1, the absorbency against pressure (AAP) was measured. On a bottom of a plastic supporting cylinder 100 having a 60 mm internal diameter, a metal gauze 101 of stainless-steel 400 mesh (mesh size of 38 μm) 101 was fusion-bonded. Then, under a condition of a room temperature (23.0° C.±2.0° C.) and 50 RH % humidity, 0.90 g of water absorbent resin (102) was evenly spread on the mesh. Subsequently, a piston 103 and a load 104 were placed in this order on the water absorbent resin, in such a way as to evenly pressurize the water absorbent resin at 4.83 kPa (0.7 psi). Then, a weight Wa (g) of this measurement set was measured. External diameters of the piston 103 were slightly smaller than 60 mm, so that there was no gap between the piston and the supporting cylinder, and upward and downward movements of the piston 103 and the load 104 would not be hampered.

Inside a petri dish 105 having a 150 mm diameter, a glass filter 106 (product of Sougo Rikagaku Glass Seisakusho Co., Ltd.; diameter of fine pores: 100 μm to 120 μm) having a 90 mm diameter was placed. Thereafter, physiological saline (0.9 weight % sodium chloride solution at a temperature of 20 to 25° C.) 108 was added until it reached a level of an upper surface of the glass filter 106. Then, a piece of filter paper 107 (product of Advantec Toyo Kaisha, Ltd.; product name: JIS P3801, No. 2; thickness: 0.26 mm; diameter of retained particles: 5 μm) having a 90 mm diameter was placed thereon, so that an entire surface of the filter paper 107 was wetted. An excess of the saline was removed.

The measurement apparatus set was placed on the wet filter paper 107. Then, the water absorbent resin was made to absorb the saline for a predetermined period of time under the load. The period of time for the absorption was set at one hour from the start of the measurement. Specifically, one hour later, the measurement apparatus set was lifted, and a weight Wb (g) thereof was measured. The measurement has to be carried out as quickly as possible and with no vibration. From the weights Wa and Wb, the absorbency against pressure (AAP) (g/g) of 4.83 kPa was calculated according to the following equation.

$$AAP\ (g/g)=[Wb\ (g)-Wa\ (g)]/\text{weight of water absorbent resin (g)}$$

(c) Saline Flow Conductivity (SFC)

Measurement of the saline flow conductivity was performed in accordance with a saline flow conductivity (SFC) test recited in Published Japanese Translations of International Publication of Patent Application No. 509591/1997 (Tokuhyohei 9-509591). By using an apparatus shown in FIG. 2, the water absorbent resin (0.900 g) evenly spread in a container 40 was swollen in a synthesized urine (1) under a pressure of 0.3 psi (2.07 kPa) for 60 minutes, and a height of a gel layer of a gel 44 was recorded. Then, 0.69 weight % sodium chloride solution 33 was made to flow from a tank 31 and to pass through the swollen gel layer at a constant hydrostatic pressure.

By using a computer and a scale, an amount of liquid passing through the gel layer at intervals of 20 seconds was recorded for 10 minutes as a time function. A flow rate Fs(t) of the solution passing through the swollen gel 44 (mainly between particles thereof) was determined in terms of g/s by dividing an increasing weight (g) by an increasing time (s). A time in which a constant hydrostatic pressure and a stable flow rate had been obtained was set as "tS", and only data obtained between "tS" and a ten-minute interval was used to calculate the flow rate, the flow rate calculated between "tS" and a ten-minute interval was used to calculate a value of Fs ($_t$=0), i.e., a first flow rate of the solution passing through the gel layer. Fs ($_t$=0) was calculated by extrapolating $_t$=0 from a result obtained by approximating a function indicative of a relationship between Fs ($_t$) and $_t$.

Saline flow conductivity (SFC) was calculated by the following equation.

$$\begin{aligned}\text{Saline flow conductivity }(SFC) &= (FS(t=0)\times L0)/(\rho\times A\times\Delta P)\\ &= (FS(t=0)\times L0)/139506\end{aligned}$$

Here,

Fs (t=0): a flow rate represented by "g/s"

L0: initial height of the gel layer that is represented by "cm"

ρ: a density (1.003 g/$cm^3$) of NaCl solution

A: an area (28.27 $cm^2$) on the upper side of the gel layer of the cell 41

ΔP: a hydrostatic pressure (4920 dyne/$cm^2$) exerted to the gel layer.

Further, a unit of the saline flow conductivity (SFC) is ($cm^3\cdot s\cdot 10^{-7}/g$).

Figure 2:
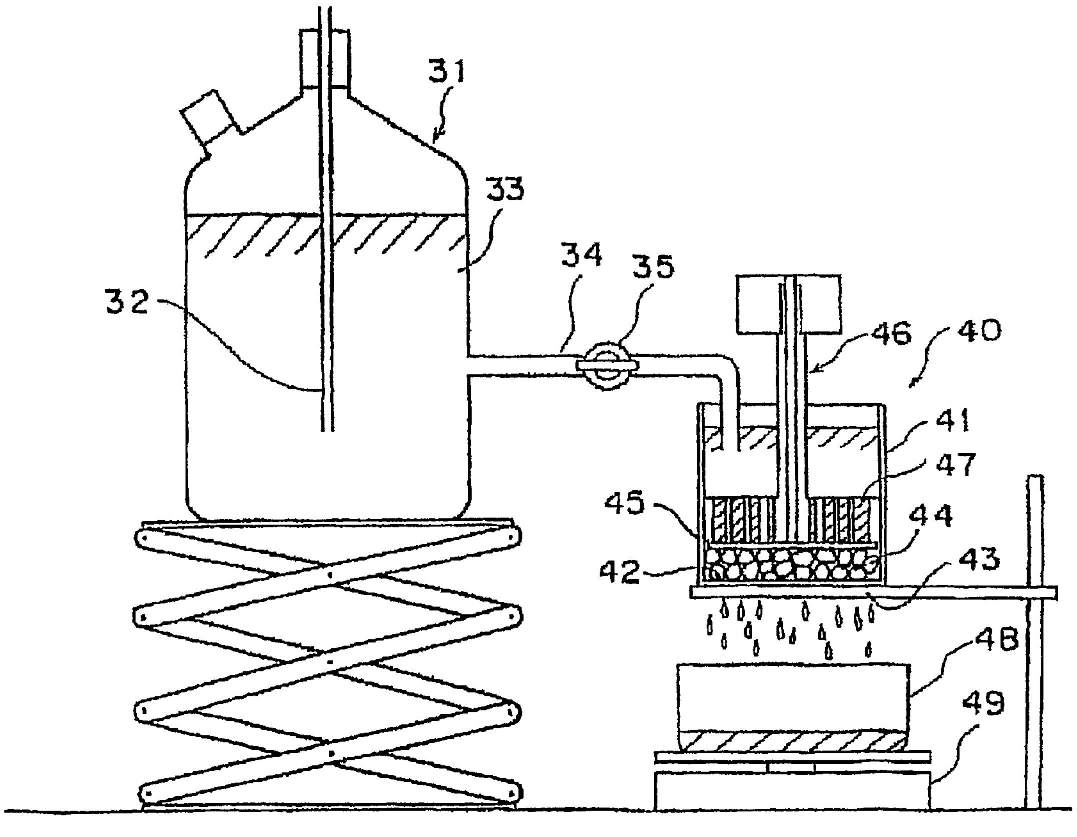
FIG. 2 is a cross sectional view schematically illustrating a measurement apparatus used in measurement of SFC.

In the apparatus shown in FIG. 2, a glass tube 32 was inserted into the tank 31, and a lower end of the glass tube 32 was disposed so that 0.69 weight % sodium chloride solution 33 was positioned 5 cm higher than a bottom of the swelling gel 44 in the cell 41. 0.69 weight % sodium chloride solution 33 contained in the tank 31 was supplied to the cell 41 via an L-shaped tube 34 with a cock. A collecting container 48 for collecting liquid having passed through the gel layer was disposed under the cell 41, and the collecting container 48 was placed on an even balance 49. An inside diameter of the cell 41 was 6 cm, and No. 400 stainless metal gauze (38 μm in mesh) 42 was placed on a bottom of a lower portion of the cell 41. A hole 47 which allowed liquid to pass through was provided on a lower portion of a piston 46, and a glass filter 45 having high permeability was provided on the bottom thereof so that the water absorbent resin or the swelling gel did not enter into the hole 47. The cell 41 was placed on a table for the cell, and the table's surface which was in contact with the cell was positioned on the stainless metal gauze 43 which did not prevent the liquid from passing through.

The synthesized urine (1) was prepared by mixing 0.25 g of calcium chloride dihydrate, 2.0 g of potassium chloride, 0.50 g of magnesium chloride hexahydrate, 2.0 g of sodium sulfate, 0.85 g of ammonium dihydrogen phosphate, 0.15 g of ammonium dihydrogen phosphate, and 994.25 g of pure water.

(d) Particle Diameter

The particle diameter was measured according to the measurement of the mass average particle diameter (D50), which is disclosed in WO2004/69915.

The water absorbent resin after pulverizing was sieved by using JIS standard sieves respectively having mesh sizes of 850 μm, 710 μm, 600 μm, 500 μm, 425 μm, 300 μm, 212 μm, 150 μm, 45 μm, and the like, and a residual percentage R was plotted on a logarithmic probability paper, thereby reading a the mass average particle diameter (D50). In case where water absorbent resin having the diameter longer than 850 μm is included, a commercially-available JIS standard sieve having a mesh size of larger than 850 μm is suitably used.

(e) Logarithmic Standard Deviation (σζ) of Particle Diameter Distribution

The logarithmic standard deviation (σζ) of particle diameter distribution was calculated according to the method recited in WO2004/69915.

The water absorbent resin was sieved by using JIS standard sieves respectively having mesh sizes of 850 μm, 710 μm, 600 μm, 500 μm, 425 μm, 300 μm, 212 μm, 150 μm, 45 μm, and the like, and a residual percentage R was plotted on a logarithmic probability paper. In case where water absorbent resin having the diameter longer than 850 μm is included, a commercially-available JIS standard sieve having a mesh size of larger than 850 μm is suitably used. Assuming that X1 is a particle diameter in case where R=84.1 weight % and X2 is a particle diameter in case where R=15.9 weight %, the logarithmic standard deviation (σζ) is represented by the following equation. As a value of σζ is smaller, the particle diameter distribution is narrower.

$$\sigma\zeta=0.5\times\ln(X2/X1)$$

Classification in measuring the logarithmic standard deviation (σζ) of the particle diameter and the particle diameter distribution was performed as follows: 10.0 g of the water absorbent resin particles was spread on JIS standard sieves (THE IIDA TESTING SIEVE: diameter is 8 cm) respectively having mesh sizes of 850 μm, 710 μm, 600 μm, 500 μm, 425 μm, 300 μm, 212 μm, 150 μm, and 45 μm, and was classified by using a sieve shaker (IIDA SIEVE SHAKER, TYPE: ES-65, SER. No. 0501) for five minutes.

(f) Paint Shaker Test

A paint shaker test (PS) was performed as follows. 10 g of glass beads each of which had a diameter of 6 mm were taken to a glass container whose diameter was 6 cm and whose height was 11 cm. 30 g of water absorbent resin or water absorbing agent was placed therein. The glass container was set in a paint shaker (product of Toyo Seiki Seisaku-sho, Ltd.: Product No. 488) and was shaken at 800 cycle/min (CPM). This device is detailed in Japanese Unexamined Patent Application No. 235378/1996 (Tokukaihei 9-235378).

A result obtained by shaking the paint shaker for 30 minutes is described as "paint shaker test 1", and a result obtained by shaking the paint shaker for 10 minutes is described as "paint shaker test 2". After shaking the paint shaker, the glass beads were removed by a JIS standard sieve whose mesh size was 2 mm so as to give damaged water absorbent resin or water absorbing agent.

Example 1

1-1

In a reaction container formed by providing a lid on a 10-liter stainless double-arm kneader equipped with two sigma vanes and a jacket, there was prepared a reaction solution by dissolving 436.4 g of acrylic acid, 4617.9 g of 37 mass % aqueous solution of sodium acrylate, 397.7 g of pure water, 8.87 g (0.07 mol %) of polyethylene glycol diacrylate (molecular weight of 523), and 0.437 g (0.02 mol %) of 1,4-butanediol. Next, this reaction solution was deaerated under an atmosphere of nitrogen gas for 20 minutes. Subsequently, 14.53 g of 20 mass % aqueous solution of sodium persulfate and 24.22 g of 0.1 mass % aqueous solution of L-ascorbic acid were added thereto under stirred conditions. As a result, polymerization initiated about 34 seconds after the addition. The polymerization was carried out at a temperature in the range from 25° C. to 92° C. while the formed gel was crushed. Then, the resultant cross-linked polymer hydrogel was retrieved 30 minutes after the initiation of the polymerization. The resultant cross-linked polymer hydrogel was fragmented into pieces substantially having gel particle diameters of about 5 mm or less, but some of them had gel particle diameters of 10 mm or greater.

1-2

The fragmented cross-linked polymer hydrogel particles were spread out on a metal gauze of 50 mesh and dried by hot air at 180° C. for 50 minutes. From a dried product thus obtained, undried gel or rubber-like particles were removed. The amount of the removed undried product was 85 g. The removal of the undried product was performed by crushing the obtained dried product, sifting the crushed dried product with a sieve having a mesh size of 5 mm, and then removing gel particles from the particles remaining on the sieve.

1-3

The dried product was pulverized with a roll mill and then classified with JIS standard sieves having mesh sizes of 710 μm and 175 μm, respectively, thus obtaining a water absorbent resin of irregularly pulverized shape.

1-4

The operation as in [1-1] through [1-3] was performed a total of five times. Then, the respective centrifugal retention capacities (CRCs) of the obtained five water absorbent resins were measured.

The respective centrifugal retention capacities (CRCs) of the obtained first to fifth water absorbent resins were 35 (g/g), (g/g), 34 (g/g), 35 (g/g), and 34 (g/g), respectively.

An average value calculated from these values was 34.6 (g/g), standard deviation a was 0.55, and CRC instability index after drying was 5.

The CRC instability index after drying was calculated by the following equation:

$$\text{CRC instability index after drying}=(\text{standard deviation }\sigma\times3)/(\text{average value})\times100$$

It was assume that a mixture of the above five water absorbent resins was a water absorbent resin (1). The mass average particle diameter (D50) of the water absorbent resin (1) was 342 μm, and the particle diameter distribution logarithmic standard deviation (a) thereof was 0.32.

Example 2

2-1

The operation was performed as in Example 1, but the amount of 1,4-butanediol was 0.873 g (0.04 mol %) instead of 0.437 g (0.02 mol %) in Example 1. The resultant cross-linked polymer hydrogel was fragmented into pieces substantially having gel particle diameters of about 5 mm or less, but some of them had gel particle diameters of 10 mm or greater.

2-2

The fragmented cross-linked polymer hydrogel particles were spread out on a metal gauze of 50 mesh and dried by hot air at 180° C. for 50 minutes. From a dried product thus obtained, undried gel or rubber-like particles were removed. The amount of the removed undried product was 91 g.

2-3

The dried product was pulverized with a roll mill and then classified with JIS standard sieves having mesh sizes of 710 μm and 175 μm, respectively, thus obtaining a water absorbent resin of irregularly pulverized shape.

2-4

The operation as in [2-1] through [2-3] was performed a total of five times. Then, the respective centrifugal retention capacities (CRCs) of the obtained five water absorbent resins were measured.

The centrifugal retention capacities (CRCs) of the obtained first to fifth water absorbent resins were 35 (g/g), 34 (g/g), 35 (g/g), 36 (g/g), and 35 (g/g), respectively.

An average value calculated from these values was 35.0 (g/g), standard deviation a was 0.71, and CRC instability index after drying was 6.

It was assumed that a mixture of the above five water absorbent resins was a water absorbent resin (2). The mass average particle diameter (D50) of the water absorbent resin (2) was 342 μm, and the particle diameter distribution logarithmic standard deviation (O) thereof was 0.32.

Example 3

3-1

The operation was performed as in Example 1, but the amount of 1,4-butanediol was 1.310 g (0.06 mol %) instead of 0.437 g (0.02 mol %) in Example 1. The resultant cross-linked polymer hydrogel was fragmented into pieces substantially having gel particle diameters of about 5 mm or less, but some of them had gel particle diameters of 10 mm or greater.

3-2

The fragmented cross-linked polymer hydrogel particles were spread out on a metal gauze of 50 mesh and dried by hot air at 180° C. for 50 minutes. From a dried product thus obtained, undried gel or rubber-like particles were removed. The amount of the removed undried product was 88 g.

3-3

The dried product was pulverized with a roll mill and then classified with JIS standard sieves having mesh sizes of 710 μm and 175 μm, respectively, thus obtaining a water absorbent resin of irregularly pulverized shape.

3-4

The operation as in [3-1] through [3-3] was performed a total of five times. Then, the respective centrifugal retention capacities (CRCs) of the obtained five water absorbent resins were measured.

The centrifugal retention capacities (CRCs) of the obtained first to fifth water absorbent resins were 35 (g/g), 35 (g/g), 36 (g/g), 34 (g/g), and 34 (g/g), respectively.

An average value calculated from these values was 34.8 (g/g), standard deviation a was 0.84, and CRC instability index after drying was 7.

It was assumed that a mixture of the above five water absorbent resins was a water absorbent resin (3). The mass average particle diameter (D50) of the water absorbent resin (3) was 342 μm, and the particle diameter distribution logarithmic standard deviation (σζ) thereof was 0.32.

Example 4

4-1

The operation was performed as in Example 1, but 0.645 g (0.035 mol %) of propyleneglycol was used instead of 0.437 g (0.02 mol %) of 1,4-butanediol in Example 1. The resultant cross-linked polymer hydrogel was fragmented into pieces substantially having gel particle diameters of about 5 mm or less, but some of them had gel particle diameters of 10 mm or greater.

4-2

The fragmented cross-linked polymer hydrogel particles were spread out on a metal gauze of 50 mesh and dried by hot air at 180° C. for 50 minutes. From a dried product thus obtained, undried gel or rubber-like particles were removed. The amount of the removed undried product was 86 g.

4-3

The dried product was pulverized with a roll mill and then classified with JIS standard sieves having mesh sizes of 710 μm and 175 μm, respectively, thus obtaining a water absorbent resin of irregularly pulverized shape.

4-4

The operation as in [4-1] through [4-3] was performed a total of five times. Then, the respective centrifugal retention capacities (CRCs) of the obtained five water absorbent resins were measured.

The centrifugal retention capacities (CRCs) of the obtained first to fifth water absorbent resins were 34 (g/g), 35 (g/g), 34 (g/g), 34 (g/g), and 35 (g/g), respectively.

An average value calculated from these values was 34.4 (g/g), standard deviation a was 0.55, and CRC instability index after drying was 5.

It was assumed that a mixture of the above five water absorbent resins was a water absorbent resin (4). The mass average particle diameter (D50) of the water absorbent resin (4) was 342 μm, and the particle diameter distribution logarithmic standard deviation (σζ) thereof was 0.32.

Example 5

5-1

The operation was performed as in Example 1, but 0.781 g (0.035 mol %) of glycerin was used instead of 0.437 g (0.02 mol %) of 1,4-butanediol in Example 1. The resultant cross-linked polymer hydrogel was fragmented into pieces substantially having gel particle diameters of about 5 mm or less, but some of them had gel particle diameters of 10 mm or greater.

5-2

The fragmented cross-linked polymer hydrogel particles were spread out on a metal gauze of 50 mesh and dried by hot air at 180° C. for 50 minutes. From a dried product thus obtained, undried gel or rubber-like particles were removed. The amount of the removed undried product was 93 g.

5-3

The dried product was pulverized with a roll mill and then classified with JIS standard sieves having mesh sizes of 710 μm and 175 μm, respectively, thus obtaining a water absorbent resin of irregularly pulverized shape.

5-4

The operation as in [5-1] through [5-3] was performed a total of five times. Then, the respective centrifugal retention capacities (CRCs) of the obtained five water absorbent resins were measured.

The centrifugal retention capacities (CRCs) of the obtained first to fifth water absorbent resins were 32 (g/g), 31 (g/g), 31 (g/g), 31 (g/g), and 32 (g/g), respectively.

An average value calculated from these values was 31.4 (g/g), standard deviation a was 0.55, and CRC instability index after drying was 5.

It was assumed that a mixture of the above five water absorbent resins was a water absorbent resin (5). The mass average particle diameter (D50) of the water absorbent resin (5) was 342 μm, and the particle diameter distribution logarithmic standard deviation (σζ) thereof was 0.32.

Comparative Example 1

1-1

The operation was performed as in Example 1, but the amount of polyethylene glycol diacrylate (molecular weight of 523) was 11.4 g (0.09 mol %) instead of 8.87 g (0.07 mol %) in Example 1, and the amount of 1,4-butanediol was 0 g instead of 0.437 g (0.02 mol %) in Example 1. The resultant cross-linked polymer hydrogel was fragmented into pieces substantially having gel particle diameters of about 5 mm or less, but many had gel particle diameters of 10 mm or greater.

1-2

The fragmented cross-linked polymer hydrogel particles were spread out on a metal gauze of 50 mesh and dried by hot air at 180° C. for 50 minutes. From a dried product thus obtained, undried gel or rubber-like particles were removed. The amount of the removed undried product was 150 g.

1-3

The dried product was pulverized with a roll mill and then classified with JIS standard sieves having mesh sizes of 710 μm and 175 μm, respectively, thus obtaining a comparative water absorbent resin of irregularly pulverized shape.

1-4

The operation as in [1-1] through [1-3] of Comparative Example 1 was performed a total of five times. Then, the respective centrifugal retention capacities (CRCs) of the obtained five comparative water absorbent resins were measured.

The centrifugal retention capacities (CRCs) of the obtained first to fifth comparative water absorbent resins were 32 (g/g), 32 (g/g), 32 (g/g), 32 (g/g), and 33 (g/g), respectively.

An average value calculated from these values was 32.2 (g/g), standard deviation a was 0.45, and CRC instability index after drying was 4.

It was assumed that a mixture of the above five comparative water absorbent resins was a comparative water absorbent resin (1). The mass average particle diameter (D50) of the comparative water absorbent resin (1) was 343 μm, and the particle diameter distribution logarithmic standard deviation (σζ) thereof was 0.32.

Comparative Example 2

2-1

The operation was performed as in Example 1, but the amount of polyethylene glycol diacrylate (molecular weight of 523) was 31.67 g (0.25 mol %) instead of 8.87 g (0.07 mol %) in Example 1, and 7.81 g (0.35 mol %) of glycerin was used instead of 0.437 g (0.02 mol %) of 1,4-butanediol. The resultant cross-linked polymer hydrogel was fragmented into pieces substantially having gel particle diameters of about 5 mm or less, but many had gel particle diameters of 10 mm or greater.

2-2

The fragmented cross-linked polymer hydrogel particles were spread out on a metal gauze of 50 mesh and dried by hot air at 180° C. for 50 minutes. From a dried product thus obtained, undried gel or rubber-like particles were removed. The amount of the removed undried product was 350 g.

2-3

The dried product was pulverized with a roll mill and then classified with JIS standard sieves having mesh sizes of 710 μm and 175 μm, respectively, thus obtaining a comparative water absorbent resin of irregularly pulverized shape.

2-4

The operation as in [2-1] through [2-3] of Comparative Example 2 was performed a total of five times. Then, the respective centrifugal retention capacities (CRCs) of the obtained five comparative water absorbent resins were measured.

The centrifugal retention capacities (CRCs) of the obtained first to fifth comparative water absorbent resins were 26 (g/g), 24 (g/g), 25 (g/g), 25 (g/g), and 26 (g/g), respectively.

An average value calculated from these values was 25.2 (g/g), standard deviation a was 0.84, and CRC instability index after drying was 10.

It was assumed that a mixture of the above five comparative water absorbent resins was a comparative water absorbent resin (2). The mass average particle diameter (D50) of the comparative water absorbent resin (2) was 342 μm, and the particle diameter distribution logarithmic standard deviation (σζ) thereof was 0.32.

Comparative Example 3

3-1

The operation was performed as in Example 1, but the amount of polyethylene glycol diacrylate (molecular weight of 523) was 1.27 g (0.01 mol %) instead of 8.87 g (0.07 mol %) in Example 1, and 0.89 g (0.04 mol %) of glycerin was used instead of 0.437 g (0.02 mol %) of 1,4-butanediol. The resultant cross-linked polymer hydrogel was fragmented into pieces substantially having gel particle diameters of about 5 mm or less, but some of them had gel particle diameters of 10 mm or greater.

3-2

The fragmented cross-linked polymer hydrogel particles were spread out on a metal gauze of 50 mesh and dried by hot air at 180° C. for 50 minutes. From a dried product thus obtained, undried gel or rubber-like particles were removed. The amount of the removed undried product was 75 g.

3-3

The dried product was pulverized with a roll mill and then classified with JIS standard sieves having mesh sizes of 710 μm and 175 μm, respectively, thus obtaining a comparative water absorbent resin of irregularly pulverized shape.

3-4

The operation as in [3-1] through [3-3] of Comparative Example 3 was performed a total of five times. Then, the respective centrifugal retention capacities (CRCs) of the obtained five comparative water absorbent resins were measured.

The centrifugal retention capacities (CRCs) of the obtained first to fifth comparative water absorbent resins were 52 (g/g), 58 (g/g), 55 (g/g), 53 (g/g), and 59 (g/g), respectively.

An average value calculated from these values was 55.4 (g/g), standard deviation a was 3.05, and CRC instability index after drying was 17.

It was assumed that a mixture of the above five comparative water absorbent resins was a comparative water absorbent resin (3). The mass average particle diameter (D50) of the comparative water absorbent resin (3) was 342 μm, and the particle diameter distribution logarithmic standard deviation (σζ) thereof was 0.32.

Comparative Example 4

4-1

The operation was performed as in Example 1, but the amount of 1,4-butanediol was 2.84 g (0.13 mol %) instead of 0.437 g (0.02 mol %) in Example 1. The resultant cross-linked polymer hydrogel was fragmented into pieces substantially having gel particle diameters of about 5 mm or less, but some of them had gel particle diameters of 10 mm or greater.

4-2

The fragmented cross-linked polymer hydrogel particles were spread out on a metal gauze of 50 mesh and dried by hot air at 180° C. for 50 minutes. From a dried product thus obtained, undried gel or rubber-like particles were removed. The amount of the removed undried product was 92 g.

4-3

The dried product was pulverized with a roll mill and then classified with JIS standard sieves having mesh sizes of 710 μm and 175 μm, respectively, thus obtaining a comparative water absorbent resin of irregularly pulverized shape.

4-4

The operation as in [4-1] through [4-3] of Comparative Example 4 was performed a total of five times. Then, the respective centrifugal retention capacities (CRCs) of the obtained five comparative water absorbent resins were measured.

The centrifugal retention capacities (CRCs) of the obtained first to fifth comparative water absorbent resins were 34 (g/g), 31 (g/g), 33 (g/g), 31 (g/g), and 34 (g/g), respectively.

An average value calculated from these values was 32.6 (g/g), standard deviation a was 1.52, and CRC instability index after drying was 14.

It was assumed that a mixture of the above five comparative water absorbent resins was a comparative water absorbent resin (4). The mass average particle diameter (D50) of the comparative water absorbent resin (4) was 342 μm, and the particle diameter distribution logarithmic standard deviation (σζ) thereof was 0.32.

Comparative Example 5

5-1

The operation was performed as in Example 1, but the amount of polyethylene glycol diacrylate (molecular weight of 523) was 12.67 g (0.1 mol %) instead of 8.87 g (0.07 mol %) in Example 1, and 4.22 g (0.1 mol %) of ethylene glycol diglycidyl ether (molecular weight of 174.2) was used instead of 0.437 g (0.02 mol %) of 1,4-butanediol. The resultant cross-linked polymer hydrogel was fragmented into pieces substantially having gel particle diameters of about 5 mm or less, but many had gel particle diameters of 10 mm or greater.

5-2

The fragmented cross-linked polymer hydrogel particles were spread out on a metal gauze of 50 mesh and dried by hot air at 180° C. for 50 minutes. From a dried product thus obtained, undried gel or rubber-like particles were removed. The amount of the removed undried product was 300 g.

5-3

The dried product was pulverized with a roll mill and then classified with JIS standard sieves having mesh sizes of 710 μm and 175 μm, respectively, thus obtaining a comparative water absorbent resin of irregularly pulverized shape.

5-4

The operation as in [5-1] through [5-3] of Comparative Example 5 was performed a total of five times. Then, the respective centrifugal retention capacities (CRCs) of the obtained five comparative water absorbent resins were measured.

The centrifugal retention capacities (CRCs) of the obtained first to fifth comparative water absorbent resins were 27 (g/g), 27 (g/g), 27 (g/g), 27 (g/g), and 28 (g/g), respectively.

An average value calculated from these values was 27.2 (g/g), standard deviation a was 0.45, and CRC instability index after drying was 5.

It was assumed that a mixture of the above five comparative water absorbent resins was a comparative water absorbent resin (5). The mass average particle diameter (D50) of the comparative water absorbent resin (5) was 342 μm, and the particle diameter distribution logarithmic standard deviation (σζ) thereof was 0.32.

Comparative Example 6

6-1

The operation was performed as in Example 1, but 4.52 g (0.063 mol %) of trimethylolpropane triacrylate (molecular weight of 296.32) was used instead of 8.87 g (0.07 mol %) of polyethylene glycol diacrylate (molecular weight of 523), and 2.72 g (0.122 mol %) of glycerin was used instead of 0.437 g (0.02 mol %) of 1,4-butanediol. The resultant cross-linked polymer hydrogel was fragmented into pieces substantially having gel particle diameters of about 5 mm or less, but some of them had gel particle diameters of 10 mm or greater.

6-2

The fragmented cross-linked polymer hydrogel particles were spread out on a metal gauze of 50 mesh and dried by hot air at 180° C. for 50 minutes. From a dried product thus obtained, undried gel or rubber-like particles were removed. The amount of the removed undried product was 82 g.

6-3

The dried product was pulverized with a roll mill and then classified with JIS standard sieves having mesh sizes of 710 μm and 175 μm, respectively, thus obtaining a comparative water absorbent resin of irregularly pulverized shape.

6-4

The operation as in [6-1] through [6-3] of Comparative Example 6 was performed a total of five times. Then, the respective centrifugal retention capacities (CRCs) of the obtained five comparative water absorbent resins were measured.

The centrifugal retention capacities (CRCs) of the obtained first to fifth comparative water absorbent resins were 32 (g/g), 32 (g/g), 35 (g/g), 34 (g/g), and 35 (g/g), respectively.

An average value calculated from these values was 33.6 (g/g), standard deviation a was 1.52, and CRC instability index after drying was 14.

It was assumed that a mixture of the above five comparative water absorbent resins was a comparative water absorbent resin (6). The mass average particle diameter (D50) of the comparative water absorbent resin (6) was 342 μm, and the particle diameter distribution logarithmic standard deviation (σζ) thereof was 0.32.

The results in Examples 1 through 3 and Comparative Examples 1 through 6 are shown in Tables 1 and 2.

TABLE 1

| | (A) | (A) mol % | (B) | (B) mol % | (B)/(A) | Resulting object |
|---|---|---|---|---|---|---|
| Example 1 | PEGDA | 0.070 | 1,4-BD | 0.020 | 0.29 | Water absorbent resin (1) |
| Example 2 | PEGDA | 0.070 | 1,4-BD | 0.040 | 0.57 | Water absorbent resin (2) |
| Example 3 | PEGDA | 0.070 | 1,4-BD | 0.060 | 0.86 | Water absorbent resin (3) |
| Example 4 | PEGDA | 0.070 | PG | 0.035 | 0.50 | Water absorbent resin (4) |
| Example 5 | PEGDA | 0.070 | glycerin | 0.035 | 0.50 | Water absorbent resin (5) |
| Comparative example 1 | PEGDA | 0.090 | — | — | — | Comparative water absorbent resin (1) |
| Comparative example 2 | PEGDA | 0.250 | glycerin | 0.350 | 1.40 | Comparative water absorbent resin (2) |
| Comparative example 3 | PEGDA | 0.010 | glycerin | 0.040 | 4.00 | Comparative water absorbent resin (3) |
| Comparative example 4 | PEGDA | 0.070 | 1,4-BD | 0.130 | 1.86 | Comparative water absorbent resin (4) |
| Comparative example 5 | PEGDA | 0.100 | EGDGE | 0.100 | 1.00 | Comparative water absorbent resin (5) |
| Comparative example 6 | TMPTA | 0.063 | glycerin | 0.122 | 1.94 | Comparative water absorbent resin (6) |

PEGDA: polyethylene glycol diacrylate
1,4-BD: 1,4-butanediol
PG: propyleneglycol
EGDGE: ethylene glycol diglycidyl ether
TMPTA: trimethylolpropane triacrylate

TABLE 2

| | Amount of undried products g | CRC after drying Instability index | Average value g/g | σ | Measured value n = 5 g/g | | | | |
|---|---|---|---|---|---|---|---|---|---|
| Example 1 | 85 | 5 | 34.6 | 0.55 | 35 | 35 | 34 | 35 | 34 |
| Example 2 | 91 | 6 | 35.0 | 0.71 | 35 | 34 | 35 | 36 | 35 |
| Example 3 | 88 | 7 | 34.8 | 0.84 | 35 | 35 | 36 | 34 | 34 |
| Example 4 | 86 | 5 | 34.4 | 0.55 | 34 | 35 | 34 | 34 | 35 |
| Example 5 | 93 | 5 | 31.4 | 0.55 | 32 | 31 | 31 | 31 | 32 |
| Comparative example 1 | 150 | 4 | 32.2 | 0.45 | 32 | 32 | 32 | 32 | 33 |
| Comparative example 2 | 350 | 10 | 25.2 | 0.84 | 26 | 24 | 25 | 25 | 26 |
| Comparative example 3 | 75 | 17 | 55.4 | 3.05 | 52 | 58 | 55 | 53 | 59 |
| Comparative example 4 | 92 | 14 | 32.6 | 1.52 | 34 | 31 | 33 | 31 | 34 |
| Comparative example 5 | 300 | 5 | 27.2 | 0.45 | 27 | 27 | 27 | 27 | 28 |
| Comparative example 6 | 82 | 14 | 33.6 | 1.52 | 32 | 32 | 35 | 34 | 35 |

Example 6

A surface cross-linking agent made of a mixture solution including 0.3 parts by mass of 1,4-butandiol, 0.6 parts by mass of propyleneglycol, and 3.0 parts by mass of pure water was evenly mixed with 100 parts by mass of the water absorbent resin (1), and the mixture thus obtained was subjected to a heating treatment at 195° C. for 30 minutes. Thereafter, obtained particles were caused to pass a JIS standard sieve with 710 μm mesh. Subsequently, the particles having passed through the JIS standard sieve with 710 μm mesh were subjected to a paint shaker test 1. Thus, a water absorbent resin (6) was obtained. That is, the water absorbent resin (6) was obtained by surface cross-linking the water absorbent resin (1) and damaging the surface-cross-linked water absorbent resin (1) with the paint shaker test 1.

Example 7

The water absorbent resin (2) instead of the water absorbent resin (1) was subjected to the same treatment as that of Example 6. Thus, a water absorbent resin (7) was obtained.

Example 8

The water absorbent resin (3) instead of the water absorbent resin (1) was subjected to the same treatment as that of Example 6. Thus, a water absorbent resin (8) was obtained.

Example 9

The water absorbent resin (4) instead of the water absorbent resin (1) was subjected to the same treatment as that of Example 6. Thus, a water absorbent resin (9) was obtained.

Example 10

The water absorbent resin (5) instead of the water absorbent resin (1) was subjected to the same treatment as that of Example 6. Thus, a water absorbent resin (10) was obtained.

Comparative Example 7

100 parts by mass of the water absorbent resin (1) was subjected to a heating treatment at 195° C. for 30 minutes. Thereafter, obtained particles were caused to pass a JIS standard sieve with 710 μm mesh. Subsequently, the particles having passed through the JIS standard sieve with 710 μm mesh were subjected to the paint shaker test 1. Thus, a comparative water absorbent resin (7) was obtained. That is, the water absorbent resin (7) was obtained by performing a heating treatment on the water absorbent resin (1) without surface cross-linking it, and damaging the heated water absorbent resin (1) with the paint shaker test 1.

Comparative Example 8

The comparative water absorbent resin (1) instead of the water absorbent resin (1) was subjected to the same treatment as that of Example 6. Thus, a comparative water absorbent resin (8) was obtained.

Comparative Example 9

The comparative water absorbent resin (2) instead of the water absorbent resin (1) was subjected to the same treatment as that of Example 6. Thus, a comparative water absorbent resin (9) was obtained.

Comparative Example 10

The comparative water absorbent resin (3) instead of the water absorbent resin (1) was subjected to the same treatment as that of Example 6. Thus, a comparative water absorbent resin (10) was obtained.

Comparative Example 11

The comparative water absorbent resin (4) instead of the water absorbent resin (1) was subjected to the same treatment as that of Example 6. Thus, a comparative water absorbent resin (11) was obtained.

Comparative Example 12

The comparative water absorbent resin (5) instead of the water absorbent resin (1) was subjected to the same treatment as that of Example 6. Thus, a comparative water absorbent resin (12) was obtained.

Comparative Example 13

100 parts by mass of the comparative water absorbent resin (6) was subjected to a heating treatment at 205° C. for 30 minutes. Thereafter, obtained particles were caused to pass a JIS standard sieve with 710 μm mesh. Subsequently, the particles having passed through the JIS standard sieve with 710 μm mesh were subjected to the paint shaker test 1. Thus, a comparative water absorbent resin (13) was obtained. That is, the water absorbent resin (13) was obtained by performing a heating treatment on the comparative water absorbent resin (6) without surface cross-linking it, and damaging the heated comparative water absorbent resin (6) with the paint shaker test 1.

Comparative Example 14

The comparative water absorbent resin (6) instead of the water absorbent resin (1) was subjected to the same treatment as that of Example 4. Thus, a comparative water absorbent resin (14) was obtained.

Table 3 shows results of measurements of Centrifugal Retention Capacity (CRC), Absorbency against Pressure (AAP) of 4.83 kPa, and Saline Flow Conductivity (SFC) of water absorbent resin obtained in Examples 6 to 10 and of comparative water absorbent resin obtained in Comparative examples 7 to 14.

TABLE 3

| | Treatment | Resulting object | CRC | AAP | SFC |
|---|---|---|---|---|---|
| Example 6 | Surface cross-linking of water absorbent resin (1) | Water absorbent resin (6) | 28 | 25 | 65 |
| Example 7 | Surface cross-linking of water absorbent resin (2) | Water absorbent resin (7) | 28 | 25 | 60 |
| Example 8 | Surface cross-linking of water absorbent resin (3) | Water absorbent resin (8) | 28 | 26 | 60 |
| Example 9 | Surface cross-linking of water absorbent resin (4) | Water absorbent resin (9) | 28 | 25 | 50 |
| Example 10 | Surface cross-linking of water absorbent resin (5) | Water absorbent resin (10) | 28 | 25 | 35 |
| Comparative example 7 | Heat treatment on water absorbent resin (1) (without surface cross-linking agent) | Comparative water absorbent resin (7) | 32 | 9 | 0 |
| Comparative example 8 | Surface cross-linking of comparative water absorbent resin (1) | Comparative water absorbent resin (8) | 28 | 24 | 45 |
| Comparative example 9 | Surface cross-linking of comparative water absorbent resin (2) | Comparative water absorbent resin (9) | 20 | 20 | 200 |

TABLE 3-continued

| | Treatment | Resulting object | CRC | AAP | SFC |
|---|---|---|---|---|---|
| Comparative example 10 | Surface cross-linking of comparative water absorbent resin (3) | Comparative water absorbent resin (10) | 30 | 21 | 5 |
| Comparative example 11 | Surface cross-linking of comparative water absorbent resin (4) | Comparative water absorbent resin (11) | 28 | 22 | 14 |
| Comparative example 12 | Surface cross-linking of comparative water absorbent resin (5) | Comparative water absorbent resin (12) | 22 | 22 | 150 |
| Comparative example 13 | Heat treatment on comparative water absorbent resin (6) (without surface cross-linking agent) | Comparative water absorbent resin (13) | 24 | 21 | 0 |
| Comparative example 14 | Surface cross-linking of comparative water absorbent resin (6) | Comparative water absorbent resin (14) | 28 | 22 | 13 |

Unit: CRC (g/g), AAP (g/g), SFC ($cm^3 \cdot s \cdot 10^{-7}/g$)

Example 11

A mixture solution including 0.80 parts by mass of 27 mass % aluminum sulfate aqueous solution (8 mass % aluminum oxide), 0.134 parts by mass of 60 mass % sodium lactate aqueous solution, and 0.016 parts by mass of propylene glycol was added to 100 parts by mass of the water absorbent resin (6). After the addition, the water absorbent resin (6) was dried at 60° C. for 1 hour without wind, and thereafter obtained particles were caused to pass the JIS standard sieve with 710 μm mesh. Subsequently, the particles having passed through the JIS standard sieve with 710 μm mesh were subjected to a paint shaker test 2. Thus, a water absorbing agent (11) was obtained.

Example 12

The water absorbent resin (7) instead of the water absorbent resin (6) was subjected to the same treatment as that of Example 11. Thus, a water absorbing agent (12) was obtained.

Example 13

The water absorbent resin (8) instead of the water absorbent resin (6) was subjected to the same treatment as that of Example 11. Thus, a water absorbing agent (13) was obtained.

Example 14

The water absorbent resin (9) instead of the water absorbent resin (6) was subjected to the same treatment as that of Example 11. Thus, a water absorbing agent (14) was obtained.

Example 15

The water absorbent resin (10) instead of the water absorbent resin (6) was subjected to the same treatment as that of Example 11. Thus, a water absorbing agent (15) was obtained.

Comparative Example 15

The comparative water absorbent resin (7) instead of the water absorbent resin (6) was subjected to the same treatment as that of Example 11. Thus, a comparative water absorbing agent (15) was obtained.

Comparative Example 16

The comparative water absorbent resin (8) instead of the water absorbent resin (6) was subjected to the same treatment as that of Example 11. Thus, a comparative water absorbing agent (16) was obtained.

Comparative Example 17

The comparative water absorbent resin (9) instead of the water absorbent resin (6) was subjected to the same treatment as that of Example 11. Thus, a comparative water absorbing agent (17) was obtained.

Comparative Example 18

The comparative water absorbent resin (10) instead of the water absorbent resin (6) was subjected to the same treatment as that of Example 11. Thus, a comparative water absorbing agent (18) was obtained.

Comparative Example 19

The comparative water absorbent resin (11) instead of the water absorbent resin (6) was subjected to the same treatment as that of Example 11. Thus, a comparative water absorbing agent (19) was obtained.

Comparative Example 20

The comparative water absorbent resin (12) instead of the water absorbent resin (6) was subjected to the same treatment as that of Example 11. Thus, a comparative water absorbing agent (20) was obtained.

Comparative Example 21

The comparative water absorbent resin (13) instead of the water absorbent resin (6) was subjected to the same treatment as that of Example 11. Thus, a comparative water absorbing agent (21) was obtained.

Comparative Example 22

The comparative water absorbent resin (14) instead of the water absorbent resin (6) was subjected to the same treatment as that of Example 11. Thus, a comparative water absorbing agent (22) was obtained.

Table 4 shows results of measurements of Centrifugal Retention Capacity (CRC), Absorbency against Pressure (AAP) of 4.83 kPa, and Saline Flow Conductivity (SFC) of water absorbing agents obtained in Examples 11 to 15 and Comparative examples 15 to 22.

TABLE 4

| | Treatment | Resulting object | CRC | AAP | SFC |
|---|---|---|---|---|---|
| Example 11 | Addition of aluminum sulfate to water absorbent resin (6) | Water absorbing agent (11) | 28 | 25 | 121 |
| Example 12 | Addition of aluminum sulfate to water absorbent resin (7) | Water absorbing agent (12) | 28 | 25 | 110 |
| Example 13 | Addition of aluminum sulfate to water absorbent resin (8) | Water absorbing agent (13) | 28 | 25 | 110 |

TABLE 4-continued

| | Treatment | Resulting object | CRC | AAP | SFC |
|---|---|---|---|---|---|
| Example 14 | Addition of aluminum sulfate to water absorbent resin (9) | Water absorbing agent (14) | 28 | 25 | 110 |
| Example 15 | Addition of aluminum sulfate to water absorbent resin (10) | Water absorbing agent (15) | 28 | 24 | 80 |
| Comparative example 15 | Addition of aluminum sulfate to comparative water absorbent resin (7) | Comparative water absorbing agent (15) | 32 | 10 | 0 |
| Comparative example 16 | Addition of aluminum sulfate to comparative water absorbent resin (8) | Comparative water absorbing agent (16) | 28 | 24 | 98 |
| Comparative example 17 | Addition of aluminum sulfate to comparative water absorbent resin (9) | Comparative water absorbing agent (17) | 20 | 20 | 350 |
| Comparative example 18 | Addition of aluminum sulfate to comparative water absorbent resin (10) | Comparative water absorbing agent (18) | 30 | 19 | 9 |
| Comparative example 19 | Addition of aluminum sulfate to comparative water absorbent resin (11) | Comparative water absorbing agent (19) | 28 | 23 | 29 |
| Comparative example 20 | Addition of aluminum sulfate to comparative water absorbent resin (12) | Comparative water absorbing agent (20) | 22 | 22 | 220 |
| Comparative example 21 | Addition of aluminum sulfate to comparative water absorbent resin (13) | Comparative water absorbing agent (21) | 24 | 21 | 5 |
| Comparative example 22 | Addition of aluminum sulfate to comparative water absorbent resin (14) | Comparative water absorbing agent (22) | 28 | 22 | 25 |

Unit: CRC (g/g), AAP (g/g), SFC ($cm^3 \cdot s \cdot 10^{-7}/g$)

An L value (Lightness) of each of the water absorbent resins obtained in the aforementioned Examples was 90 or more in Hunter's Lab color system on its resin surface, which shows that the water absorbent resin was less colored.

INDUSTRIAL APPLICABILITY

The present invention relates to (i) a water absorbent resin production method, (ii) a water absorbent resin, each of which realizes a smaller amount of undried products even in case of polymerizing an unsaturated monomer in the presence of an internal cross-linking agent while crushing a resulting cross-linked polymer hydrogel and drying the obtained cross-linked polymer hydrogel without further crushing after the polymerization, and (iii) usage thereof. The method does not require further crushing of the cross-linked polymer hydrogel after the polymerization, and therefore the method allows effective production of a water absorbent resin and a water absorbing agent each with excellent water absorbent property.

Furthermore, the method for producing a water absorbent resin, the water absorbent resin, and a water absorbing agent, each in accordance with the present invention, can be widely used not only for sanitary materials but also for usage of conventional water absorbent resins, such as for horticulture, cable-waterproofing agents, civil engineering and architecture, and foods.

Therefore, the present invention is applicable to manufacture of sanitary materials, horticulture industries, civil engineering and architecture industries and food industries that produce the above products, and to chemical industries that produce water absorbing agents. Thus, the present invention is very useful.

The invention claimed is:

1. A method for producing a water absorbent resin, comprising the steps of:

(i) polymerizing in a reactor having a crushing means a monomer including an unsaturated monomer containing a carboxyl group, in the presence of an internal cross-linking agent (A) having two or more radically polymerizable unsaturated groups in its single molecule and in the presence of a non-polymeric internal cross-linking agent (B) having in its single molecule two or more functional groups each of which allows formation of an ester bond or an amide bond by reacting with a carboxyl group, while crushing a produced cross-linked polymer hydrogel in the reactor having crushing means; and (ii) drying the crushed cross-linked polymer hydrogel obtained in the step (i) so that an amount of the internal cross-linking agent (B) remaining in the water absorbent resin obtained in the step (ii) is not more than $1.0\times10^{-5}$ mol/g, wherein:

an amount of the internal cross-linking agent (A) is 0.01 mol % or more and 0.2 mol % or less relative to an amount of the unsaturated monomer containing a carboxyl group, and a molar ratio (B)/(A) of the internal cross-linking agent (A) and the non-polymeric internal cross-linking agent (B) is 0.01 or more and 1.8 or less.

2. The method as set forth in claim 1, wherein the internal cross-linking agent (B) has in its single molecule two or three functional groups each of which allows formation of an ester bond or an amide bond by reacting with a carboxyl group.

3. The method as set forth in claim 1, wherein each of the functional groups of the internal cross-linking agent (B) which functional group allows formation of the ester bond or the amide bond by reacting with a carboxyl group reacts with the carboxyl group at 110° C. or higher temperature.

4. The method as set forth in claim 1, wherein each of the functional groups is a hydroxyl group.

5. The method as set forth claim 1, wherein a molecular weight of the internal cross-linking agent (B) is 40 or more and 500 or less.

6. The method as set forth in claim 1, wherein the unsaturated monomer containing a carboxyl group is an acrylic acid and/or an alkali metal salt thereof.

7. The method as set forth in claim 1, further comprising the step (iii) of mixing the water absorbent resin obtained in the step (ii) with a surface cross-linking agent and heating the mixture so as to cross-link the surface of the water absorbent resin.

8. The method as set forth in claim 7, wherein: the step (iii) is carried out so that a centrifugal retention capacity (CRC) of the water absorbent resin whose surface has been cross-linked is lower, by not less than 3 g/g, than a centrifugal retention capacity of the water absorbent resin whose surface has not been cross-linked and the centrifugal retention capacity (CRC) of the water absorbent resin whose surface has been cross-linked is not less than 26 g/g.

9. The method as set forth in claim 7, wherein the step (iii) is carried out so that an amount of the internal cross-linking agent (B) remaining in the water absorbent resin whose surface has been cross-linked is not more than $0.1\times10^{-5}$ mol/g.

10. A method for producing a water absorbing agent including a water absorbent resin and a liquid permeability improving agent, said method comprising the step of adding the liquid permeability improving agent to the water absorbent resin having been produced by the method as set forth in claim 1.

11. A method for producing a water absorbing agent including a water absorbent resin and a liquid permeability improving agent, said method comprising the step of adding the liquid permeability improving agent to the water absorbent resin having been produced by the method as set forth in claim 7.

* * * * *